United States Patent [19]
Watanabe

[11] Patent Number: 5,515,192
[45] Date of Patent: May 7, 1996

[54] OPTICAL SYSTEMS MAKING USE OF PHENOMENON OF STIMULATED BRILLOUIN SCATTERING

[75] Inventor: Shigeki Watanabe, Kawasaki, Japan

[73] Assignee: Fujitsu Limited, Kawasaki, Japan

[21] Appl. No.: 32,240

[22] Filed: Mar. 17, 1993

[30] Foreign Application Priority Data

Mar. 19, 1992 [JP] Japan ................................. 4-063969

[51] Int. Cl.⁶ .................................................. H04J 14/02
[52] U.S. Cl. ........................ 359/124; 359/160; 359/341; 359/173; 372/26
[58] Field of Search .................... 359/123, 124, 359/129, 154, 160, 173, 181, 341; 372/26, 29

[56] References Cited

U.S. PATENT DOCUMENTS

| | | | |
|---|---|---|---|
| 4,778,238 | 10/1988 | Hicks | 350/96.16 |
| 4,881,790 | 11/1989 | Mollenauer | 359/154 |
| 4,977,620 | 12/1990 | Smith et al. | 359/154 |
| 5,121,241 | 6/1992 | Veith | 359/152 |
| 5,166,821 | 11/1992 | Huber | 359/181 |
| 5,170,457 | 12/1992 | Jen | 385/123 |
| 5,210,808 | 11/1993 | Grasso et al. | 359/154 |
| 5,285,306 | 2/1994 | Heidemann | 359/160 |

FOREIGN PATENT DOCUMENTS

| | | | |
|---|---|---|---|
| 60-66494 | 4/1985 | Japan | H01S 3/30 |
| 1-112830 | 5/1989 | Japan | H04B 9/00 |
| 1-130638 | 5/1989 | Japan | H04B 9/00 |

OTHER PUBLICATIONS

Mao et al, Brillouin Scattering in Externally Modulated Lightwave AM–VSB CATV transmission systems.

*Primary Examiner*—Leo Boudreau
*Assistant Examiner*—Rafael Bacares
*Attorney, Agent, or Firm*—Staas & Halsey

[57] ABSTRACT

An optical signal generator, an optical communication system, and a method for searching for a Fresnel reflection point in an optical transmission line make use of characteristic features of stimulated Brillouin scattering (SBS). In the optical signal generator, exciting light supplied to an optical transmission line, formed of a nonlinear optical medium, showing stimulated Brillouin scattering, is amplitude-modulated with an information signal. The threshold value for stimulated Brillouin scattering in the optical medium is positioned between a high level and a low level of the modulated waveform.

10 Claims, 23 Drawing Sheets

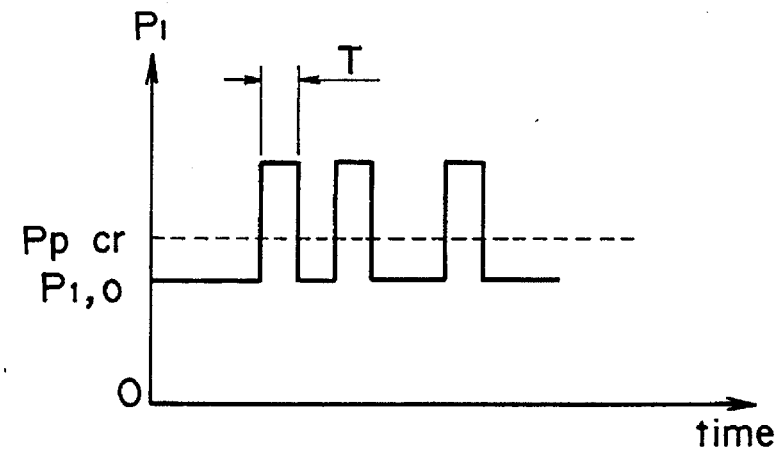
FIG.5A
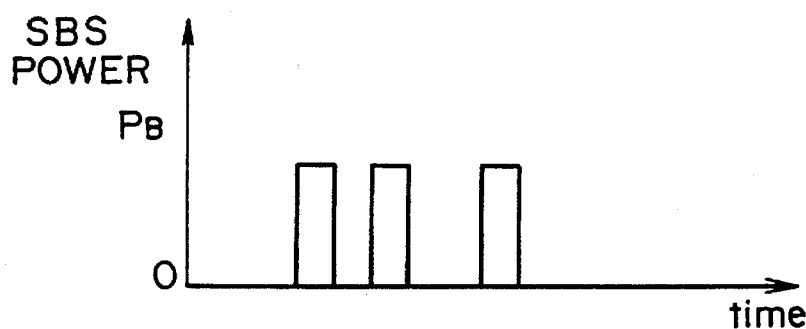
FIG.5B
FIG.6
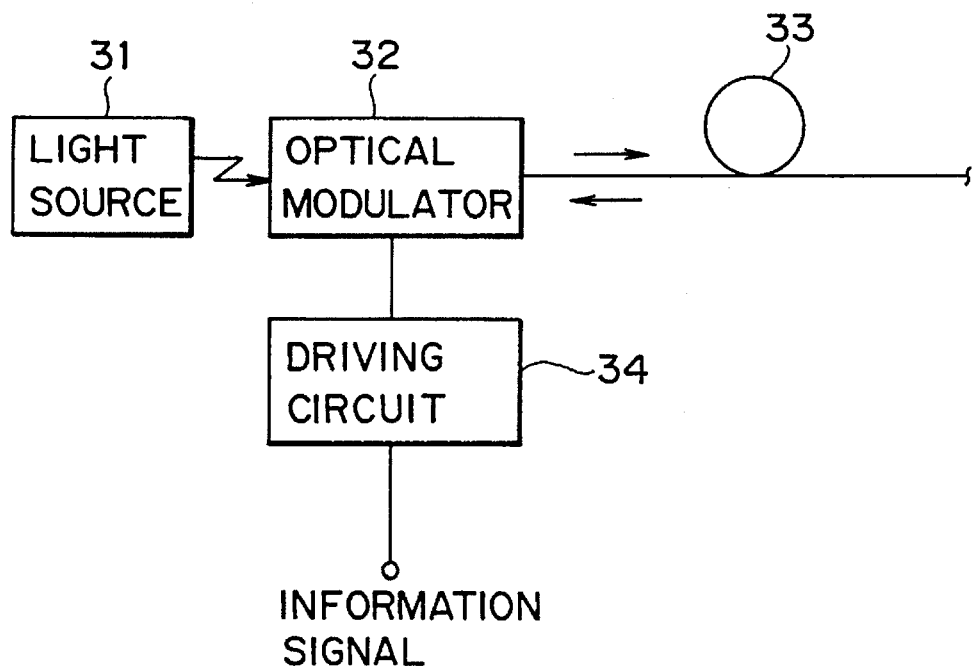

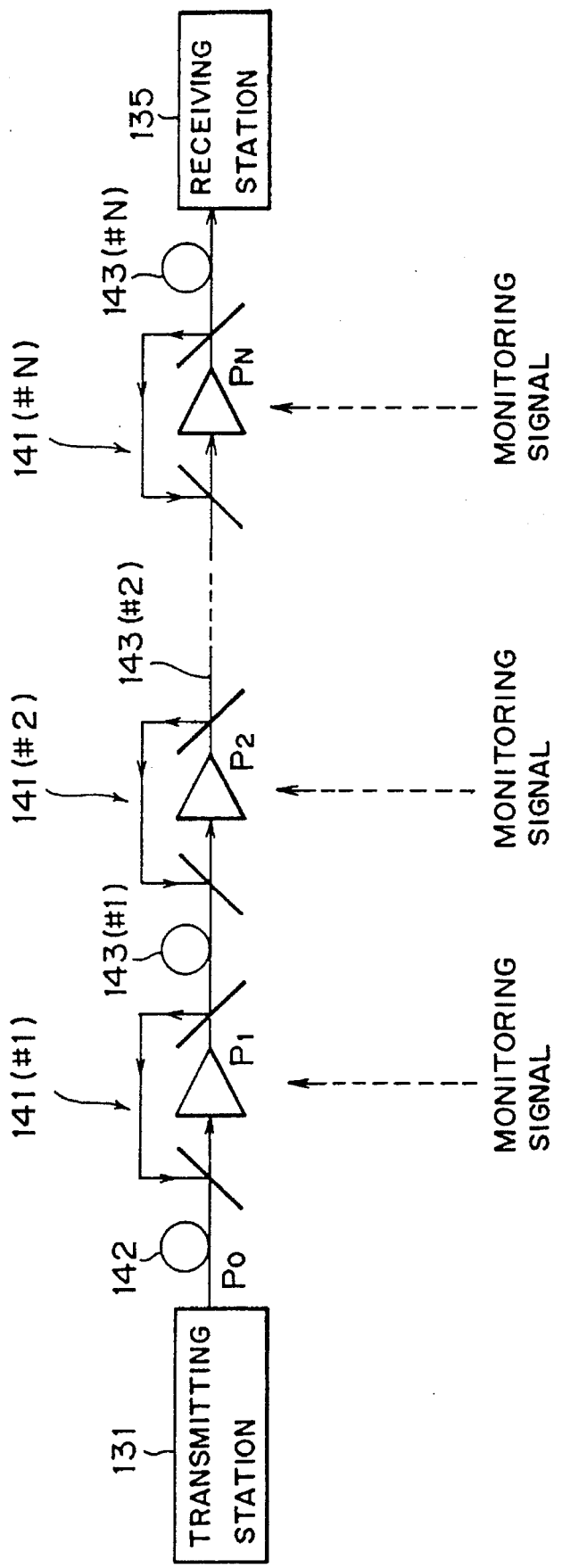

OPTICAL SYSTEMS MAKING USE OF PHENOMENON OF STIMULATED BRILLOUIN SCATTERING

BACKGROUND OF THE INVENTION

Field of the Invention

The present invention generally relates to applications of action of stimulated Brillouin scattering to optical systems and, more particularly, relates to optical signal generators, optical communication systems, and methods for searching for a Fresnel reflection point in an optical transmission line arranged by making use of the phenomenon of stimulated Brillouin scattering.

The stimulated Brillouin scattering is a nonlinear optical phenomenon and it has not been positively utilized in such fields as optical communication. Rather, there have been made proposals to avert the adverse effect of the stimulated Brillouin scattering as a factor producing deteriorated transmission characteristics. Namely, it may safely be said that it has been a technological subject how to suppress the generation of the stimulated Brillouin scattering. The phenomenon of stimulated Brillouin scattering has such peculiar characteristics that: (a) the threshold value for it is extremely lower (by one to two digits) than that for other nonlinear optical effect (1 mW or so in the case of a single mode fiber whose loss is 0.2 dB/km or so); (b) since it is produced through interaction between incident light and acoustic phonon, the Stokes' shift is small (for example, approximately 11 GHz at 1.55 μm band in the case of a single mode silica fiber); and (c) only backward scattered light is mainly produced therein. Accordingly, it is considered that a variety of applications of it to optical systems would be achieved if such characteristics could be advantageously utilized.

Description of the Related Art

There have been few proposals for optical systems arranged by positively utilizing the effects of stimulated Brillouin scattering except that an application of it to an optical filter making use of the narrow band characteristic of the stimulated Brillouin scattering and an application of stimulated Brillouin scattered light and exciting light to wavelength division multiplexing have only been contemplated. The fact that there are made only a few applications of the stimulated Brillouin scattering is considered to be due to the narrowness of the band for the stimulated Brillouin scattering. Since the stimulated Brillouin scattering depends on interaction of incident light with an acoustic phonon, the band is determined by the relaxation time of the acoustic phonon. Accordingly, the band at normal temperature is on the order of 10 to 100 MHz. Because of this narrowness in bandwidth, substantially no application of it to broadband transmission such as optical communication has been contemplated.

SUMMARY OF THE INVENTION

An object of the present invention is to make use of the characteristics of the stimulated Brillouin scattering phenomenon and effectively apply it to optical systems.

More particularly, an object of the present invention is to advantageously utilize the stimulated Brillouin scattering phenomenon to thereby provide optical generators, optical communication systems, and methods for searching for a Fresnel reflection point in an optical transmission line.

According to an aspect of the present invention, there is provided an optical signal generator utilizing the phenomenon of stimulated Brillouin scattering, which comprises an optical modulating means for modulating exciting light with a first information signal to thereby output amplitude-modulated light, an optical transmission line formed of a nonlinear optical medium showing stimulated Brillouin scattering and operatively connected with the optical modulating means for propagating the amplitude-modulated light therethrough, and control means operatively connected with the optical modulating means for controlling the optical modulating means so that the threshold value for stimulated Brillouin scattering in the optical medium is positioned between high level and low level of the modulated waveform of the amplitude-modulated light with the first information signal, and in which stimulated Brillouin scattered light is generated in the optical transmission line in the direction opposite to the propagating direction of the amplitude-modulated light.

It is preferred that the exciting light has previously been modulated with a second information signal having a higher frequency or a higher bit rate than the first information signal.

According to another aspect of the present invention, there is provided a method for searching for a Fresnel reflection point in an optical transmission line formed of a nonlinear optical medium showing stimulated Brillouin scattering, which comprises the steps of: supplying an excited light having a higher intensity than the threshold value for stimulated Brillouin scattering in the optical medium to the optical transmission line from its end; superposing an optical pulse signal having a frequency lower than the frequency of the exciting light by a predetermined frequency on the exciting light and supplying the light thus obtained to the optical transmission line from the end; and measuring change With time of the intensity of light emitted from the end of the optical transmission line.

According to a further aspect of the present invention, there are provided optical communication systems making use of the operating principles of the above described optical signal generators and the principles of stimulated Brillouin amplification.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 5A and FIG. 5B are diagrams explanatory of modulated SBS light;

FIG. 6 is a diagram showing a first embodiment of an optical signal generator;

FIG. 20 is a diagram showing a first embodiment of a multistage repeating system;

DESCRIPTION OF THE PREFERRED EMBODIMENTS

Figure 1:
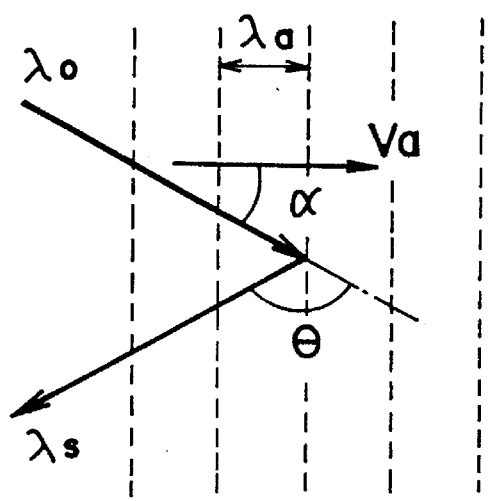
FIG. 1 is a diagram explanatory of the principle in which stimulated Brillouin scattering is generated.

First, the principle in which Brillouin scattering is generated will be described with reference to FIG. 1. We suppose that an elastic wave is traveling in a medium at a velocity of $V_a$, and accordingly a refractive index grating with a period corresponding to a wavelength $\lambda_a$ is also traveling at the velocity $V_a$. A supplied light wave (wavelength $\lambda_0$, wave number $k_0$) is subjected to Bragg reflection by the grating so as to be strongly diffracted in a specific direction θ. Then, if the frequency of the scattered light is represented by $\omega_s$, the wavelength by $\lambda_s$, and the wave number by $k_s$, and the frequency of the elastic wave is represented by $\omega_a$, the wavelength by $\lambda_a$, and the wave number by $k_s$, the following conservation laws hold:

$$\omega_s = \omega_0 - \omega_a \tag{1}$$

$$k_s = k_0 - k_a \tag{2}$$

If the Doppler effect, when the grating is traveling at the velocity $V_a$ is taken into consideration, Stokes' shift is expressed as $$\omega_0 - \omega_s = \omega_a = k_a v_a = 2v_a k_0 \sin(\theta/2) \tag{3}$$

Accordingly, Stokes' shift is maximized where θ=π, i.e., in backward scattering, and minimized where θ=0, i.e., in forward scattering. Especially when the medium is a single mode fiber (SMF), there is produced only the backward scattering.

From expression (3), Stokes' shift Δν is given by $$\Delta v = v_a = \omega_a/2\pi = 2n v_a/\lambda_0 \tag{4}$$

where n is the refraction index of the medium. In the case of an optical silica fiber in which the main component is $SiO_2$, when it is assumed that $V_a$=6.96 km/s, n=1.45, and $\lambda_0$=1.55 μm, we obtain $$\Delta v \approx 11.2 \text{ GHz} \tag{5}$$

When Stokes' light, generated by the scattering of the supplied light, comes to drive an ultrasonic vibration of the medium, stimulated Brillouin scattering (SBS) is generated. The mechanism of generation of SBS is such that electric fields of optical frequencies $\omega_0$ and $\omega_s$ produce a change in pressure with a frequency ($\omega_a = \omega_0 - \omega_s$) in the medium by electrostriction, whereby an ultrasonic wave is generated, and the ultrasonic wave causes scattering of the supplied light with the frequency $\omega_0$ to thereby generate Stokes' light with the frequency $\omega_s$, which in turn generates an ultrasonic wave by electrostriction.

Figure 2:
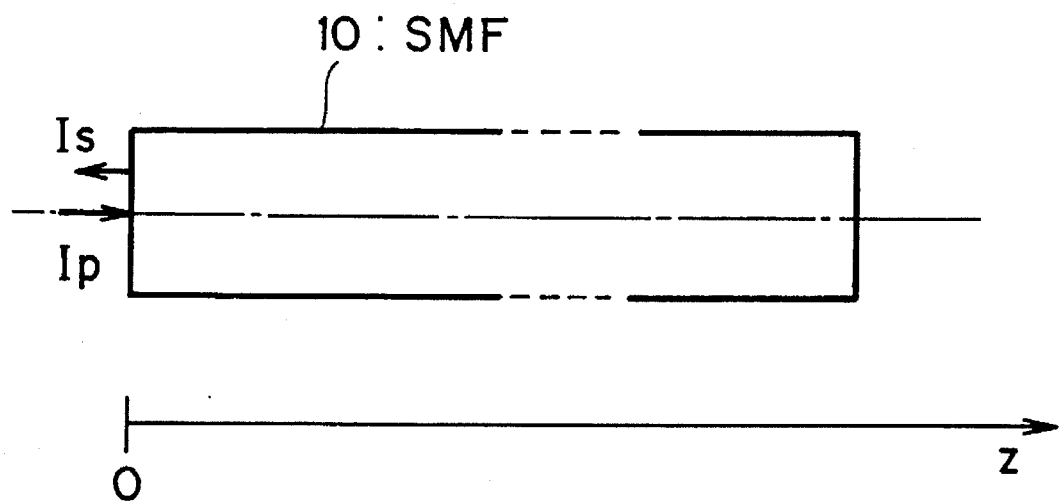
FIG. 2 is a diagram explanatory of the process of generation of stimulated Brillouin scattering (SBS) in a single mode fiber.

The above phenomenon will be quantitatively discussed with reference to FIG. 2. Now, as shown in FIG. 2, we imagine a coordinate system with the excitation end of the SMF 10 taken as the origin and the propagating direction of the exciting light taken as the z axis. Then, the coupling equations of light intensity become as follows:

$$dI_s(z)/dz = -g_B I_p(z) I_s(z) + \alpha I_s(z) \tag{6}$$

$$dI_p(z)/dz = -g_B I_p(z) I_s(z) - \alpha I_p(z) \tag{7}$$

where $I_p(z)$ and $I_s(z)$ represent intensity of the exciting light and the scattered light, respectively, and α represents the loss coefficient of the fiber, while $g_B$ represents the Brillouin gain coefficient, which is given by the following formula.

$$g_B(v) = \{(\Delta v_B/2)^2/[(v-v_B)^2 + (\Delta v_B/2)^2]\} g_B(v_B) \tag{8}$$

where $$g_B(v_b B) = 2\pi n^7 P_{12}^2/c\lambda_0^2 \rho_0 v_A \Delta v_B \tag{9}$$

$$\Delta v_B = 1/(\pi T_b) \tag{10}$$

and, further, c is the velocity of light in a vacuum, $p_{12}$ the longitudinal elastic optical constant, $\rho_0$ the density, $v_B$ the center frequency of the Brillouin band, and $\Delta v_B$ the band width (FWHM) of the Brillouin gain in the case where the lifetime of the phonon is $T_B$. Here, it is assumed that the acoustic wave attenuates at the rate of exp(-t/TB). Accordingly, the gain spectrum in this case becomes that of the Lorentzian type. While the attenuation constants of a fiber for the Stokes' light and the exciting light are generally different, a common value of $\alpha$ can provide sufficient approximation because the difference in frequency between the signal light and the exciting light in the system under consideration is only 11 GHz or so. By solving the equations (6) and (7) under the boundary condition $I_p(z) \to 0 (z \to \infty)$, the following solutions are obtained:

$$I_s(z) = [b_0(1-b_0)/(G(z)-b_0)]I_p(0)\exp(-\alpha z) \quad (11)$$

$$I_p(z) = [(1-b_0)G(z)/(G(z)-b_0)]I_p(0)\exp(-\alpha z) \quad (12)$$

where $$G(z) = \exp[(1-b_0)(g_0/\alpha)(1-\exp(-\alpha z))] \quad (13)$$

$$b_0 = I_s(0)/I_p(0) \quad (14)$$

$$G_0 = g_B I_p(0) \quad (15)$$

Further, $b_0$ is the Brillouin conversion efficiency (the ratio of the power of Stokes' light to the power of the exciting light) and go is the small signal gain in the SBS process.

Figure 3:
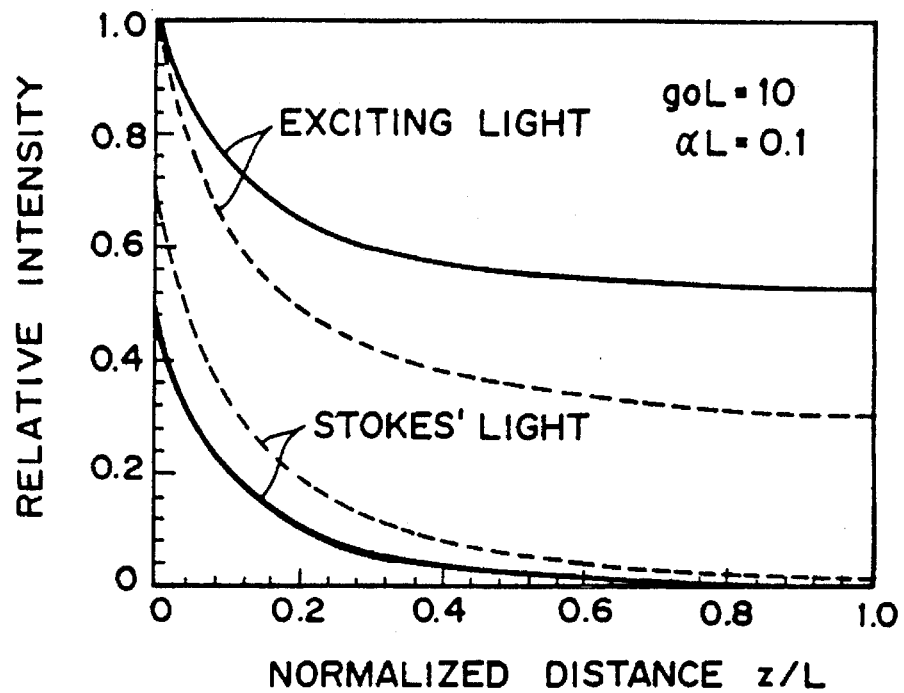
FIG. 3 is a graph showing relationships between relative intensity and normalized distance.

The solutions (11) and (12) are depicted in FIG. 3. FIG. 3 is a graph showing the relationships between the relative intensity of the exciting light and Stokes' light with respect to the value of the distance of a point in an optical fiber from its excitation end, normalized by the total length of the optical fiber. Energy of the exciting light is converted to scattered light by SBS and output backwardly. Therefore, if signal light with the same frequency as the frequency of the Stokes' light is supplied from the other excitation end of the optical fiber, the signal light is amplified. The principle of this amplification will be considered below. We now assume that the power of the exciting light is sufficiently great and there is substantially no attenuation other than loss (depletion-less). Then, from equation (7), we obtain $$I_p(z) = I_p(0)\exp(-\alpha z) \quad (16)$$

Now, the following quantity will be defined as the effective exciting power used in SBS.

$$\begin{align} I_p \text{ eff} &= (I_p(0)/\alpha)[1 - \exp(-\alpha L)] \quad (17) \\ &= I_p(0)L_{eff} \end{align}$$

where $$L_{eff} = [1-\exp(-\alpha L)]/\alpha \quad (18)$$

Then, from equation (6), $$\begin{align} I_s(L) &= I_s(0)\exp[-(g_B I_p \text{ eff} - \alpha)dz] \\ &= I_s(0)\exp[-g_B I_p(0)L_{eff} + \alpha L] \end{align}$$

Namely, we obtain $$I_s(0) = I_s(L)\exp[g_B I_p(0)L_{eff} - \alpha L] \quad (19)$$

Expression (19) shows the state of the signal light supplied to the position at the distance L from the excitation end, from which the exciting light is supplied, undergoing Brillouin amplification. Using the power $P_p$ of the exciting light and the effective sectional area $A_{eff}$ of the core of the fiber, Expression (19) can also be expressed as $$I_s(0) = I_s(L)\exp[g_B P_p L_{eff}/A_{eff} - \alpha L] \quad (20)$$

From expression (20), we obtain the following expression as the condition of the power of the exciting light for the threshold value $P_p^{cr}$ $$g_B P_p^{cr} L_{eff}/A_{eff} \approx 21 \quad (21)$$

By substituting into this expression the conditions of the single mode fiber for the wavelength 1.55 μm, $A_{eff} \approx 50$ μm$^2$, $L_{eff} \approx 20$ km, and $g_B = 5 \times 10^{-11}$ m/W, we obtain $$P_p^{cr} \approx 1.1 \text{ mW} \quad (22)$$

While a wide range of examples can be considered as applications of the principle of stimulated Brillouin amplification, when attempt is made to apply it to ordinary optical communication, its relatively narrow band (approximately 10 MHz) becomes an obstacle. This narrowness in bandwidth constitutes no obstacle to the present invention, which will be apparent from the following explanation.

Figure 4:
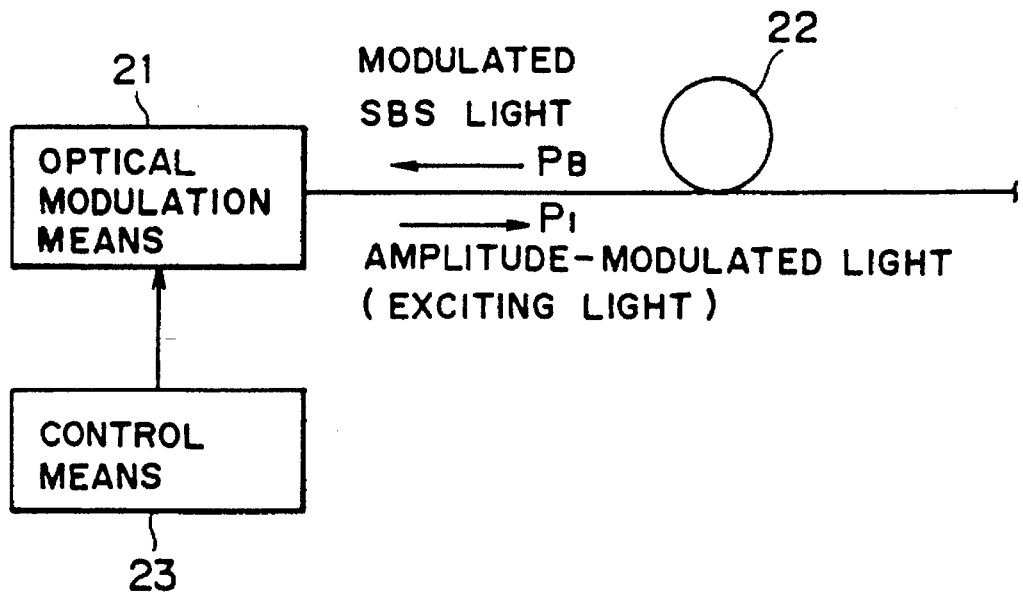
FIG. 4 is a diagram showing a basic structure of an optical signal generator.

FIG. 4 is a block diagram showing a basic structure of an optical signal generator according to the present invention. Reference numeral 21 denotes an optical modulation means for amplitude-modulating exciting light with an information signal and for outputting the modulated light. Reference numeral 22 denotes an optical transmission line through which the amplitude-modulated light from the optical modulating means 21 propagates. The optical transmission line 22 is formed of an optical medium having a nonlinear effect of the second order. Reference numeral 23 denotes a control means for controlling the optical modulation means 21. Its controlling manner is such that the above described SBS threshold value in the optical medium is brought between a high level and low level of the modulated waveform with respect to the information signal of the amplitude-modulated light, so that the SBS light propagating in the direction opposite to the propagating direction of the amplitude-modulated light is generated in the optical transmission line 22. The SBS light has the following characteristics.

FIG. 5A shows the waveform of the amplitude-modulated light supplied to the optical transmission line 22 and FIG. 5B shows the waveform of the SBS light generated in the optical transmission line 22. Exciting light having the power $P_1$ is supplied to the optical transmission line 22 with the power $P_1$ set to a value equal to the SBS threshold value $P_p^{cr}$ in the optical transmission line 22 or a value $P_1$,0 slightly below $P_p^{cr}$. Then, the exciting light is amplitude-modulated with the information signal. While, in the example shown, the information signal is a digital signal, it may be an analog signal. However, the modulated pulse width T is set to be sufficiently greater than the attenuation constant $T_B$ of the phonon such that $$T \gg T_B \quad (23)$$

Then, the SBS light is generated only when $P_1 > P_p^{cr}$ and, hence, amplitude-modulated SBS light having the waveform as shown in FIG. 5B can be generated.

FIG. 6 is a block diagram showing a first embodiment of the optical signal generator. Reference numeral 33 denotes a single mode fiber as the optical transmission line. Optical modulation means is formed of a light source 31 for outputting exciting light and an optical modulator 32 for amplitude-modulating the exciting light from the light source 31. As the optical modulator 32, that of a Mach- Zehnder type or the like is used and this optical modulator 32 is adapted to be supplied with a driving signal from a driving circuit 34. According to this arrangement, amplitude-modulated light as shown in FIG. 5(A) is supplied from the optical modulator 32 to the single mode fiber 33 and, as a result, SBS light with an amplitude-modulated waveform as shown in FIG. 5B is generated.

Figure 7:
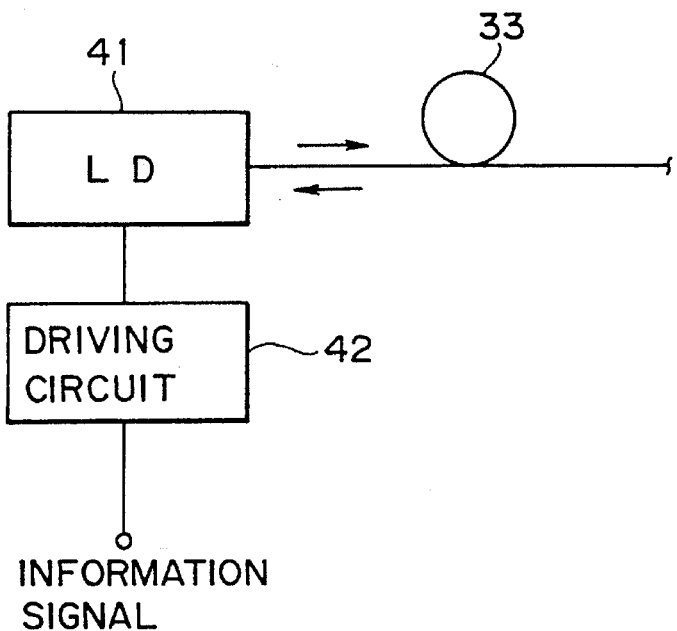
FIG. 7 is a diagram showing a second embodiment of an optical signal generator.

FIG. 7 is a block diagram showing a second embodiment of the optical signal generator. In this embodiment, the optical modulation means includes a laser diode 41, and amplitude modulation of exciting light with an information signal is achieved by having a bias signal to be supplied to the laser diode 41 modulated by a driving circuit 42.

Figure 8:
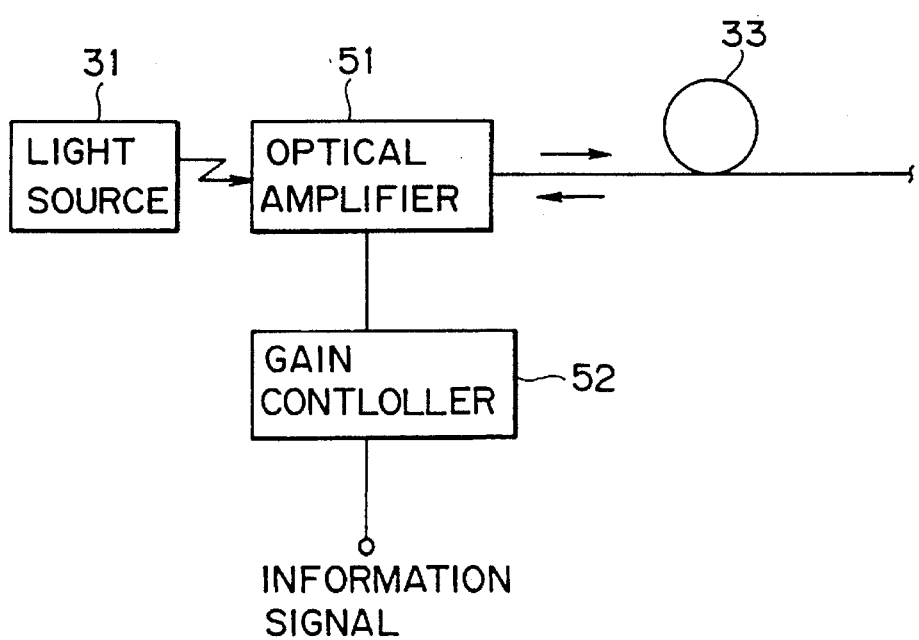
FIG. 8 is a diagram showing a third embodiment of an optical signal generator.

FIG. 8 is a block diagram showing a third embodiment of the optical signal generator. In this embodiment, the optical modulation means includes a light source 31 for outputting exciting light and an optical amplifier 51 for amplifying the exciting light from the light source 31, in which the gain of the optical amplifier 51 is modulated by a gain controller 52. When an optical amplifier provided with a semiconductor gaining medium is used as the optical amplifier 51, the amplitude-modulated light can be obtained by modulating the injected current to the semiconductor gaining medium with the information signal. When an optical amplifier of a fiber type is used as the optical amplifier 51, the light source for pumping the fiber is modulated. A particular example of the same will be described below.

Figure 9:
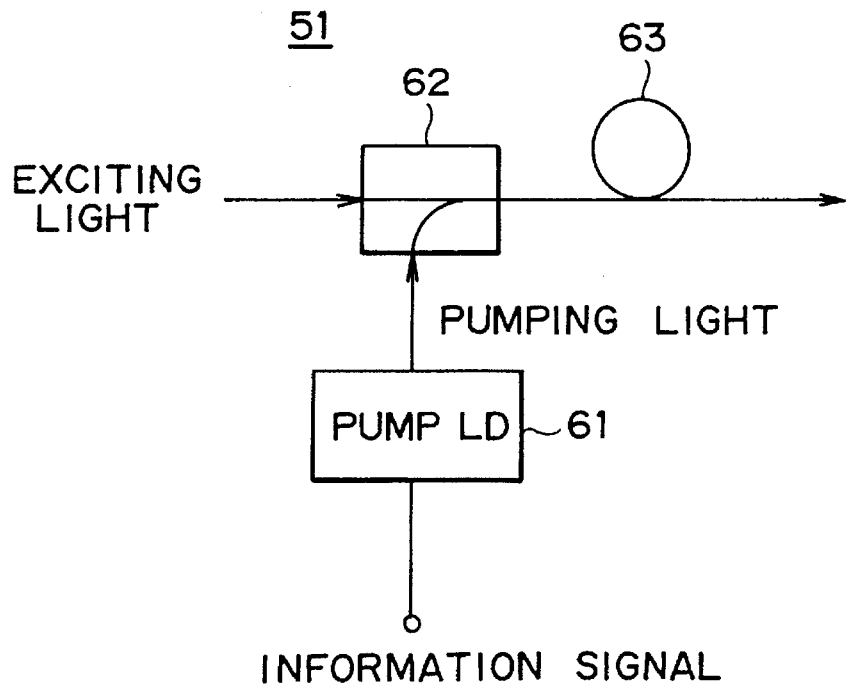
FIG. 9 is a diagram showing an example of an optical amplifier in the third embodiment of FIG. 8.

FIG. 9 is a block diagram showing an example of the structure of the optical amplifier 51 in the optical signal generator according to the third embodiment of FIG. 8. In this example, the optical amplifier 51 comprises a pump laser diode 61 for outputting pumping light, an optical coupler 62 for adding the pumping light to the exciting light from the light source 31 in FIG. 8, and a doped fiber 63 to one end of which the pumping light and the exciting light from the optical coupler 62 are supplied. The second end of the doped fiber 63 is connected to the single mode fiber 33 shown in FIG. 8. The doped fiber 63 is doped with a rare earth element such as Er. The bias current for the pump laser diode 61 is modulated with the information signal. In an optical amplifier of the described fiber type, the gain of the optical amplifier is determined by the intensity of the pumping light. Therefore, by modulating the bias current for the pump laser diode 61 with the information signal as described above, the amplitude modulation of the light output from the doped fiber 63 can be achieved.

Figure 10:
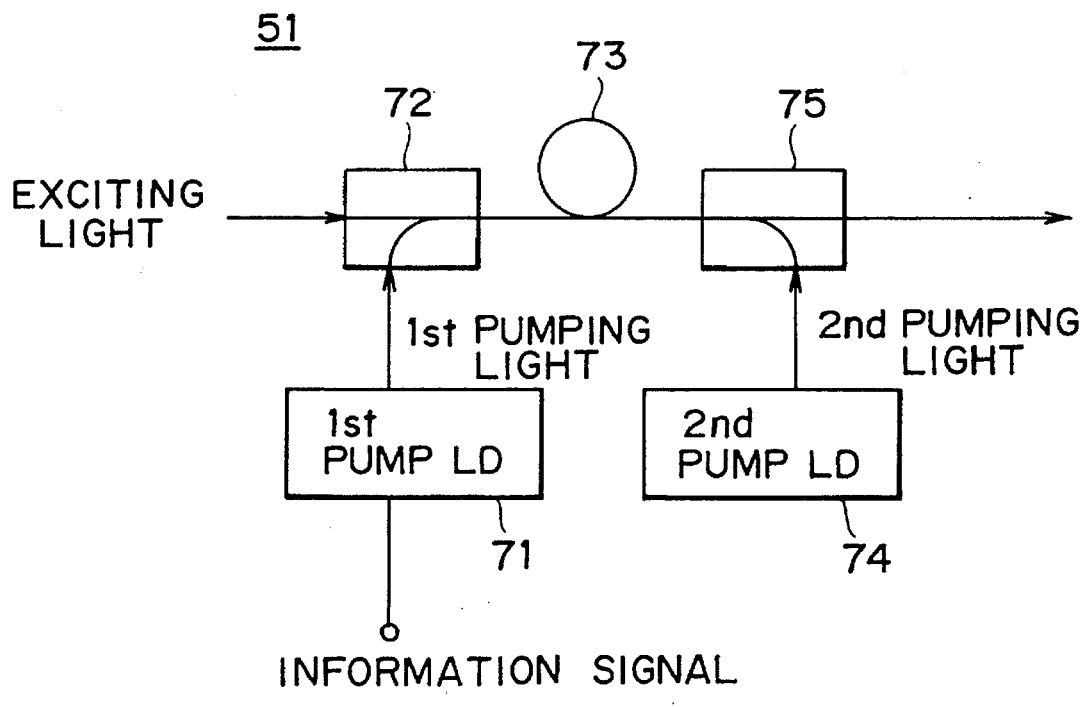
FIG. 10 is a diagram showing another example of an optical amplifier in the third embodiment of FIG. 8.

FIG. 10 is a block diagram showing another example of a structure of the optical amplifier in the optical signal generator according to the third embodiment of FIG. 8. In this example, the optical amplifier 51 comprises a first pump laser diode 71 for outputting a first pumping light, a first optical coupler 72 for adding the first pumping light to the exciting light to be amplified from the light source 31 in FIG. 8 and outputting the light added together, a doped fiber 73 supplied, at its one end, with the first pumping light and the exciting light from the first optical coupler 72, a second pump laser diode 74 for outputting a second pumping light, and a second optical coupler 75 for supplying the second pumping light to the doped fiber 73 from its second end. Since two pump laser diodes are used, the described arrangement is advantageous when the output of one pump laser diode is not sufficient for providing the required optical amplification. Otherwise, one of the two pump laser diodes (the second pump laser diode 74 in the case of FIG. 10) can be used for bringing the power of the exciting light supplied from the optical amplifier to the single mode fiber 33 in FIG. 8 above the SBS threshold value. This happens while the information signal is superposed on the bias current supplied to the other pump laser diode (the pump laser diode 71 in FIG. 10) to thereby achieve the amplitude modulation. In the present embodiment, pumping light is injected into the doped fiber 73 from both the upstream side and the downstream side thereof, but pumping light may be injected only from either of the upstream side and the downstream side using two or more pump laser diodes. Further, the first pump laser diode 71 and the first optical coupler 72 may be eliminated from the arrangement of FIG. 10 to thereby form an optical amplifier of a rear-pumping type. In this case, the bias current for the second pump laser diode 74 is amplitude-modulated.

As shown in expression (23), the modulated pulse width T (including the information signal) is required to be sufficiently greater than the attenuation constant of the phonon. Accordingly as the modulated pulse width T becomes grater, the bandwidth of the information signal becomes narrower and, hence, the transmittable volume of information becomes smaller. Now, the limit to the transmission speed in the case where the optical signal generator of the present invention is used will be considered. Apparently, the above limit is dependent on the effective reachable distance $L_{eff}$ of the exciting light defined in expression (18). The light, backwardly output as the SBS light is an accumulation of the SBS light, within the range of the effective reachable distance $L_{eff}$ of the supplied exciting light. Accordingly, when the difference in delayed time between the SBS light from the vicinity of the excitation end of the fiber and the SBS light from the effective reachable distance $L_{eff}$ is denoted by $\Delta t$, the pulse waveform will be distorted unless $\Delta t$ is sufficiently smaller than T. When a single mode fiber is used as the optical transmission line, the effective reachable distance of the exciting light is about 20 km and the time constant of the nonlinear effect is sufficiently smaller than the difference in delayed time $\Delta t$, and therefore, $\Delta t$ is equal to the time taken by the light to go to and return from the effective reachable distance, i.e., it becomes approximately $2 \times 10^{-4}$ sec. Supposing now that the condition $\Delta t/T < 0.2$ provides the range within which the signal can be demodulated, we obtain $T > 1 \times 10^{-3}$ sec. Then, the speed limit of the transmittable signal becomes approximately 1 kb/s. Since the speed of the monitoring signal in an optical repeater to which the present invention can suitably be applied is 100 b/s or so, the above limit of speed is practically sufficient.

Now, the case where setting $P_1 > P_p^{cr}$ is made in FIG. 5A will be considered. In this case, SBS is produced at all times and stimulated Brillouin amplification is applied to light with the same wavelength as the wavelength of the SBS light. Accordingly, it becomes possible to amplify and transmit light with the same frequency as the SBS light through a fiber.

Figure 11:
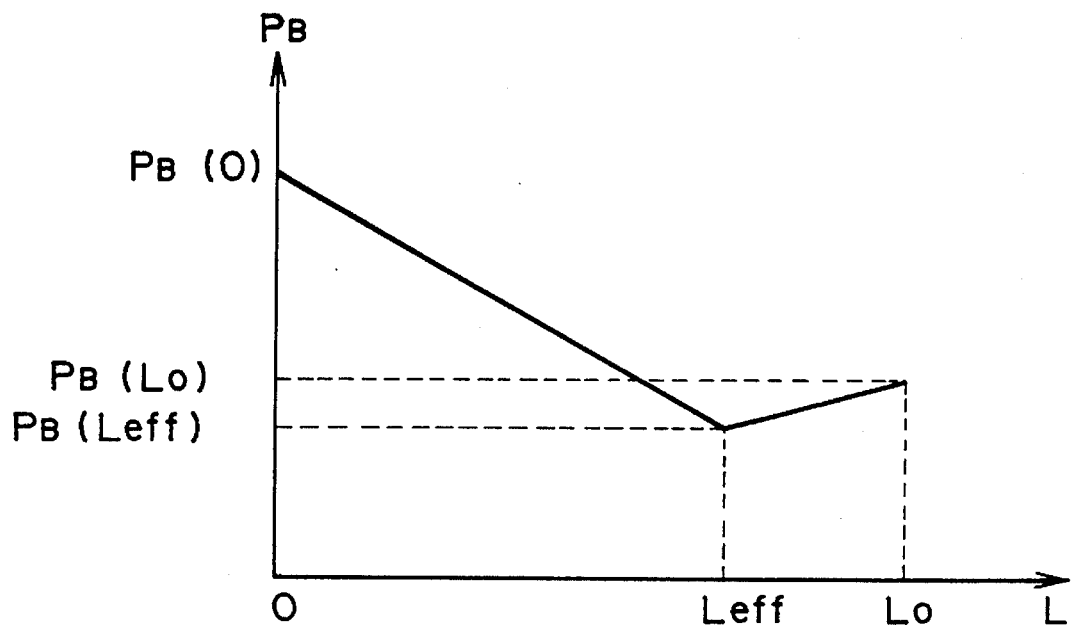
FIG. 11 is a level diagram of SBS light in stimulated Brillouin amplification.

The level diagram of power $P_B$ of the SBS light, when the fiber length is set to $L_0$, is shown in FIG. 11. In the diagram, the excitation end of the optical fiber is taken as the origin of the distance. At this time, the following expression can be derived from expression (20)

$$P_B(0) = P_B(L_0) \exp[g_B P_p L_{eff}/A_{eff} - \alpha L_0] \qquad (24)$$

Figure 12:
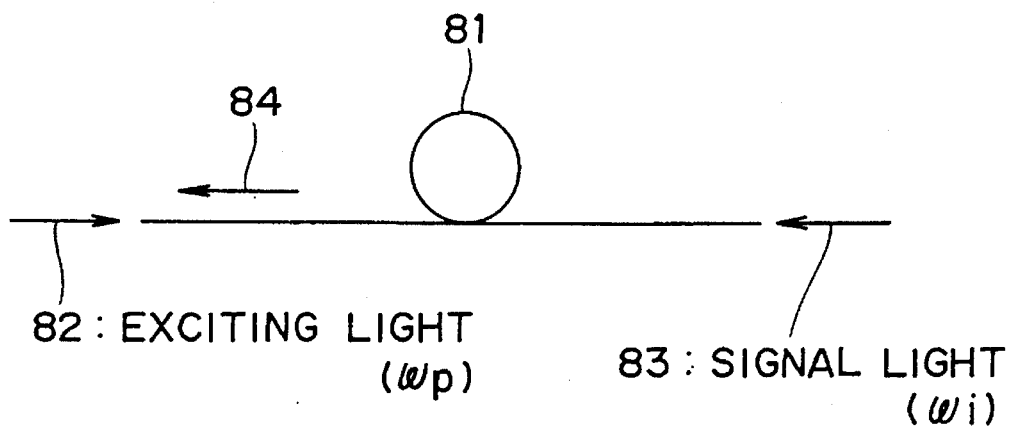
FIG. 12 is a diagram explanatory of an optical system making use of stimulated Brillouin amplification.

FIG. 12 is a diagram explanatory of an optical communication system making use of the principle of the above described stimulated Brillouin amplification. This system comprises an optical transmission line 81 formed of a nonlinear optical medium showing stimulated Brillouin scattering, a means for introducing exciting light 82 with a higher intensity than the threshold value for stimulated Brillouin scattering in the optical medium into the optical transmission line 81 from its first end, and a means for introducing the signal light 83 having a predetermined frequency relationship with the exciting light 82 into the optical transmission line 81 from its second end. The center frequency $\omega_i$ of the signal light coincides with the center frequency of the Brillouin amplification band and the relationship between this frequency and the frequency $\omega_p$ of the exciting light is expressed as $$\omega_i = \omega_p - \omega_a \quad (25)$$

where $\omega_a$ is given by expression (4).

According to the system of FIG. 12, the signal light 83 can be amplified by stimulated Brillouin amplification in the optical transmission line 81 and transmitting the signal light in the direction opposite to that of the exciting light 82 as indicated by the arrow 84.

Figure 13:
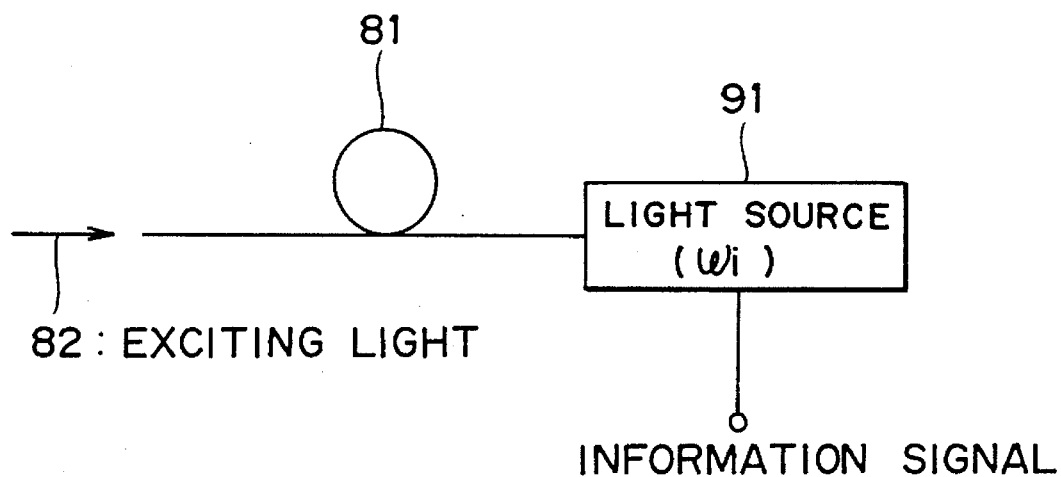
FIG. 13 is a diagram showing a particular example of the system of FIG. 12.

FIG. 13 is a diagram showing a particular example of the system of FIG. 12. The most simple embodiment, as the means for generating the signal light 83 in FIG. 12, uses a light source 91 oscillating at a frequency of $\omega_i$, which supplies the emitted light therefrom to the optical transmission line 81. The light source 91 is modulated with the information signal. In this case, any such modulating methods as amplitude modulation, phase modulation, and frequency modulation can be used. According to the described arrangement, the signal light from the light source 91, modulated with the information signal, can be amplified by stimulated Brillouin amplification in the optical transmission line 81 and transmitted in the direction opposite to that of the exciting light 82.

Figure 14:
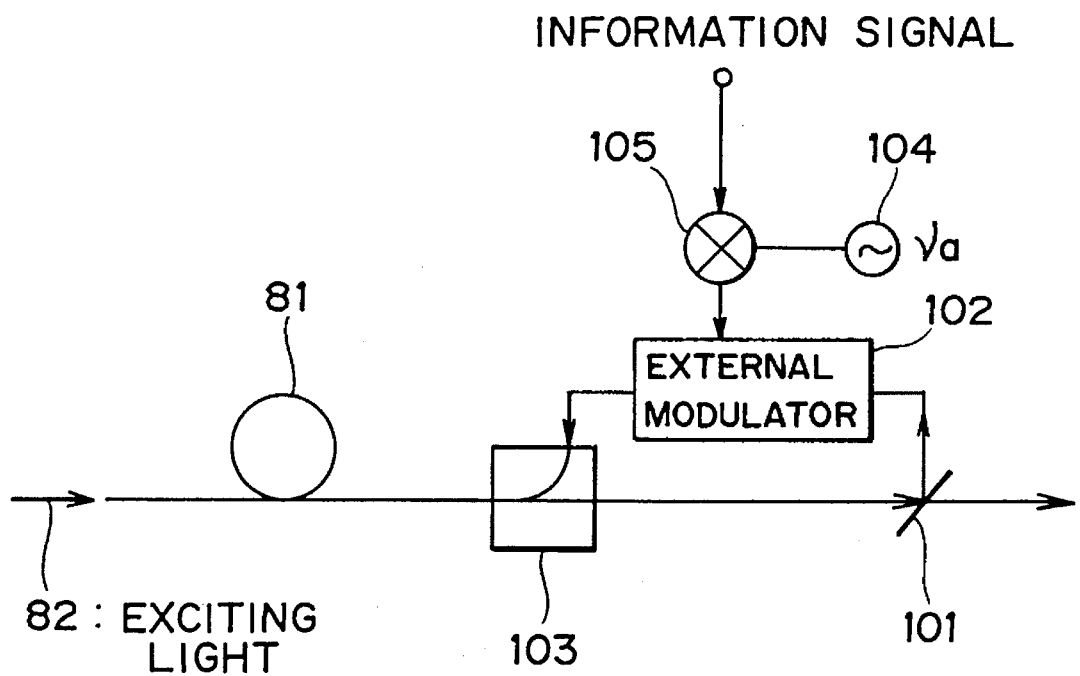
FIG. 14 is a diagram showing another particular example of the system of FIG. 12.

FIG. 14 is a diagram showing another particular example of the system of FIG. 12. In this example, the light source of the signal light is not provided independently as in the example of FIG. 13, but is arranged such that the exciting light from the optical transmission line 81 is split and the separated light is subjected to subcarrier modulation. More specifically, the exciting light supplied to the optical transmission line 81 from its first end is passed through an optical coupler 103 connected to the second end of the optical transmission line 81 and split by a half mirror 101. The separated exciting light is subjected to subcarrier modulation in an external modulator 102, constituted of a $Li N_b O_3$ optical modulator or the like, and this modulated light is supplied to the optical transmission line 81, through the optical coupler 103, in the reverse direction. The subcarrier at a frequency of $v_a$ from an oscillator 104 is modulated with the information signal in a mixer 105 and the output thus modulated is supplied to the external modulator 102.

Figure 15:
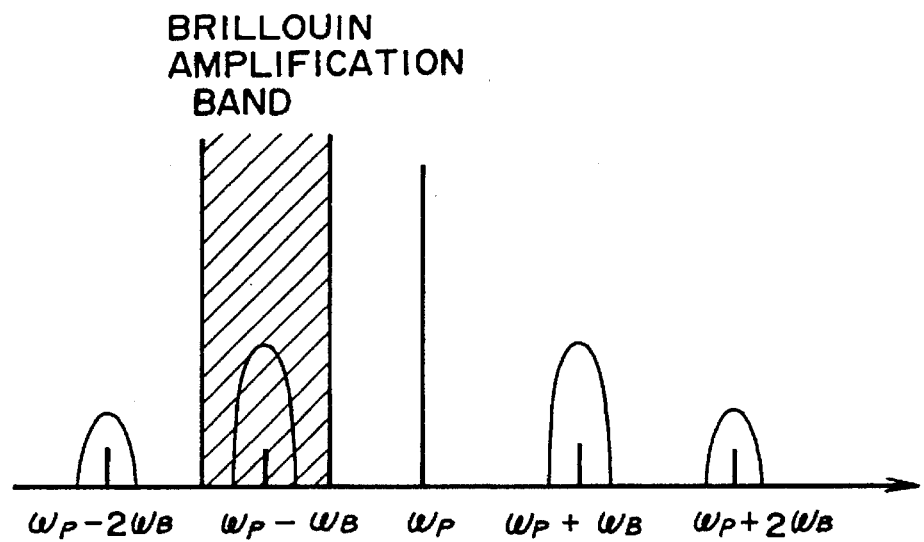
FIG. 15 is a diagram showing a spectrum in subcarrier modulation.

The spectrum of the modulated signal light obtained at this time is shown in FIG. 15. The center of the Brillouin amplification band and the center of the modulated signal of the first order (the modulated signal on the lower frequency side in the case illustrated) coincides with each other and this signal component only is amplified by the stimulated Brillouin amplification. Accordingly, it becomes possible to detect this signal component at the other end of the optical transmission line to thereby detect the information. According to this example, the need for an independent light source for the signal light can be eliminated and, yet, subcarrier modulation can be achieved using an electric oscillator with high accuracy, and stabilized stimulated Brillouin amplification can be achieved.

Figure 16:
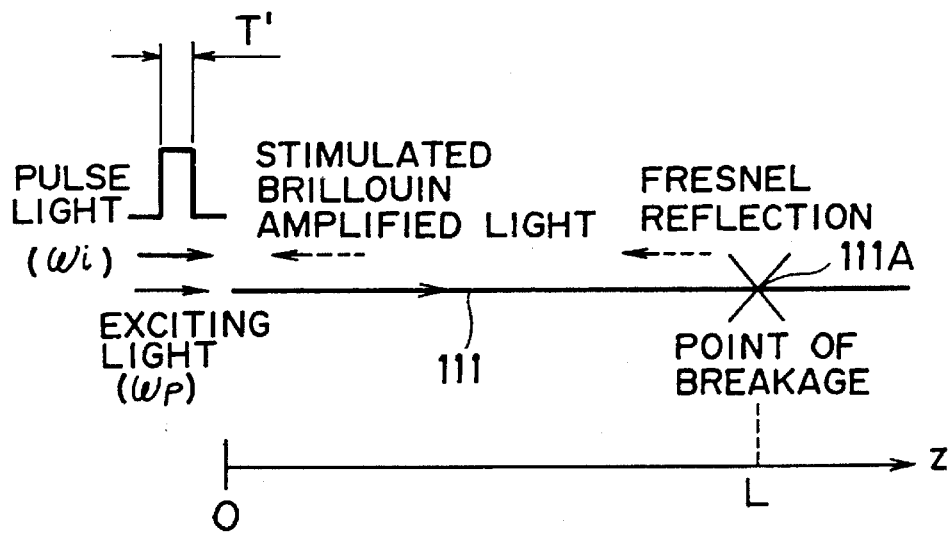
FIG. 16 is a diagram explanatory of a method for searching for a Fresnel reflection point in an optical transmission line.

Now, referring to FIG. 16, a searching method for a Fresnel reflection point, such as a point of breakage of an optical transmission line, will be described. Continuous exciting light, at a frequency of $\omega_p$ and power higher than the SBS threshold value and pulse light at a frequency of $\omega_i$ satisfying expression (25) are supplied to an optical transmission line 111 formed of a single mode fiber or the like. The pulse width of the pulse light is T'. The z axis is taken in the propagating direction, while the end of the optical transmission line 111 is taken as the origin, and the coordinate of the point of breakage 111A is denoted by L. The pulse light is subjected to Rayleigh scattering in the optical transmission line 111 and the backwardly scattered component is amplified by stimulated Brillouin amplification and returns to the end. Meanwhile, Fresnel reflection occurs at the point of breakage 111A and backwardly scattered light is generated. The scattered component of the pulse light is amplified by stimulated Brillouin amplification and returns to the end.

Figure 17:
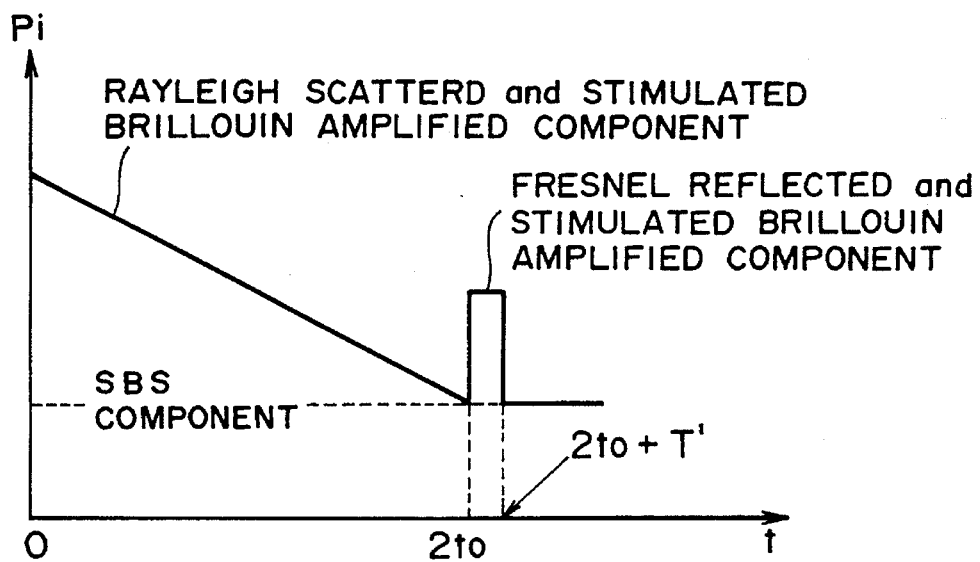
FIG. 17 is a graph showing change with time of Brillouin amplification band component of backwardly scattered light.

At this time, the change with time of the component $P_i$ at the frequency $\omega_i$, out of the total backwardly scattered light observed at the end of the optical transmission line 111, is shown in FIG. 17 with the time of incidence of the pulse light taken as the zero point. More specifically, $P_i$ represents a composite of the Rayleigh scattered component, the stimulated Brillouin scattered component, and the Fresnel reflected component. If, now, the observed time of the Fresnel reflected component is denoted by $2t_0$ after the incidence of the pulse light, the position L of the point of breakage is given by $$L = (c/n) t_0 \quad (26)$$

The resolving power $\Delta L$ in the observation is given by $$\Delta L = (c/n) T' \quad (27)$$

Since the Rayleigh scattered light and the Fresnel reflected light are both weak, there is generally a limit to the observable distance due to loss in the optical transmission line. However, according to the above described method, the position of a point of breakage at a long distance can be observed with high accuracy by making use of the great gain in the stimulated Brillouin amplification.

Figure 18:
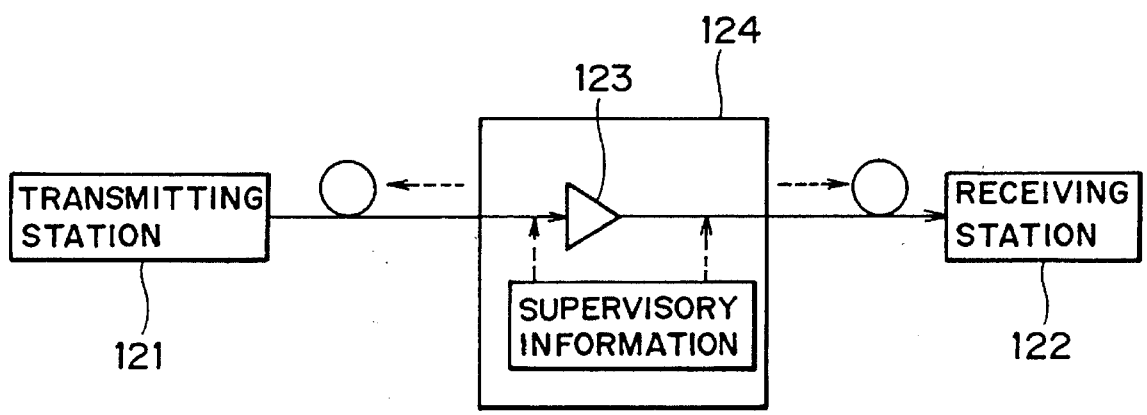
FIG. 18 is a diagram showing a general optical communication system.

Now, a description will be given of an optical communication system to which an optical signal generator of the present invention is applied. When, as shown in FIG. 18 (prior art), optical communication is performed between a transmitting station 121 and a receiving station 122 with the use of an optical repeater 124 including an optical amplifier 123, the optical repeater 124 is generally located at a remote point from both the transmitting station 121 and the receiving station 122. Therefore, it sometimes becomes necessary for the transmitting station 121 or the receiving station 122 to monitor a response as to supervisory information on the optical amplifier 123. Such a monitoring function is of great significance in achieving stabilized performance of the system as a whole and in quickly detecting the point of trouble in the event of some trouble or other interference occurring at a point. While the particulars to be monitored include information such as operating conditions of the optical amplifier, the temperature, etc., they are not of a great amount but at most several tens of bits. As the means for transmitting such monitoring information, there has been in use such a method that applies subcarrier amplitude modulation to the main signal using the monitoring signal, transmits the modulated signal through repeaters with an optical amplifying function, and detects the signal by filter detection. In such a method, however, the degree of modulation of the monitoring signal cannot be increased, in principle, to prevent the sensitivity of the main signal from being lowered. Accordingly, there has been a limit to the number of stages of the repeating optical amplifiers on account of effects of noises due to spontaneously emitted light. Therefore, the optical signal generator according to the present invention has been devised so as to be used for transmitting the monitoring signal.

Figure 19:
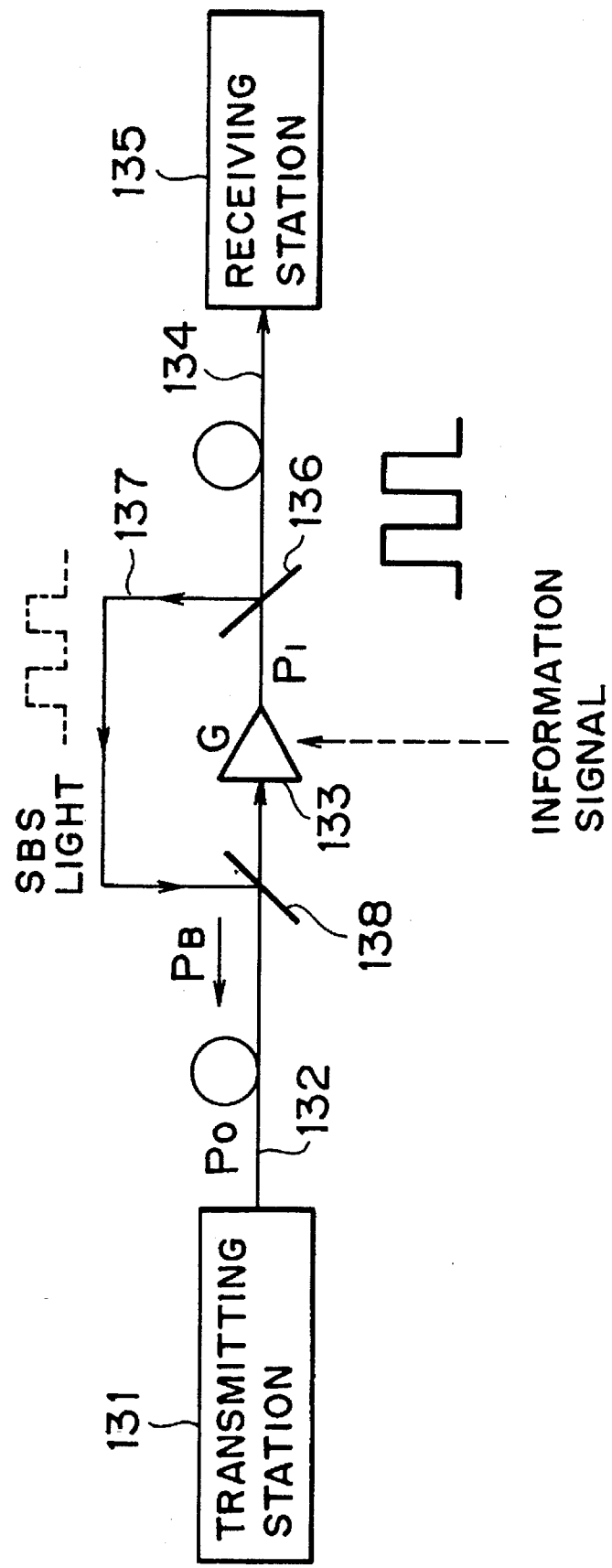
FIG. 19 is a diagram showing an optical communication system making use of the principle of the optical signal generator described in FIG. 4, FIG. 5, and others.

FIG. 19 is a block diagram of an optical communication system with the principle of the generator described with reference to FIG. 4, FIG. 5, etc. applied thereto. Signal light with power $P_0$ from a transmitting station (first terminal station) 131 is transmitted through an optical fiber 132, the signal light is compensated for attenuation in power by amplification in an optical amplifier 133 with the gain G, and the signal light is transmitted to a receiving station (second terminal station) 135 through an optical fiber 134. At this time, if the loss in the optical fibers 132 and 134 is represented by $\Gamma$ and the output power from the optical amplifier 133 by $P_1$, the following equation holds.

$$P_1 = P_0 \Gamma G \qquad (28)$$

Having the output power $P_1$ from the optical amplifier 133 set to the SBS threshold value $P_p^{cr}$ in the optical fiber 134 or a value $P_{1,0}$ slightly lower than the threshold value, the output power $P_1$ is amplitude-modulated with the monitoring signal (digital signal) between the levels above and below the threshold value $P_p^{cr}$. The modulated pulse width T is set to be sufficiently larger than the attenuation constant of the phonon. By so doing, the SBS light is generated only when $P_1 > P_p^{cr}$ on the operating principle described in FIG. 5. SBS light generated in the optical fiber 134, in the direction from the receiving station 135 toward the optical amplifier 133, is separated from the main optical path in a beam splitter 136 and, passing through a detour optical path 137, coupled to the main optical path through another beam splitter 138. Thereby, transmission of the SBS light amplitude-modulated with the monitoring signal to the transmitting station 131 is achieved. The transmitting station 131 and the receiving station 135 have an optical transmitter and an optical receiver for the main signal, respectively. The transmitting station 131 further has a monitoring signal receiver. The structure of the monitoring signal receiver will be described later.

The case where setting in the system of FIG. 19 is made such that $P_0 > P_p^{cr}$ will be considered. In this case, the optical fiber 132 between the transmitting station 131 and the optical amplifier 133 exhibits stimulated Brillouin amplification to light with the same wavelength as the SBS light. Accordingly, the SBS light obtained as described above by modulation with the monitoring signal can further be amplified in the optical fiber 132 and transmitted to the transmitting station 131. The level diagram of the SBS light in this case, with the fiber length set to $L_0$ and the end of the optical fiber 132 on the side of the transmitting station 131 taken as the origin, becomes the same as shown in FIG. 11.

Figure 21A:
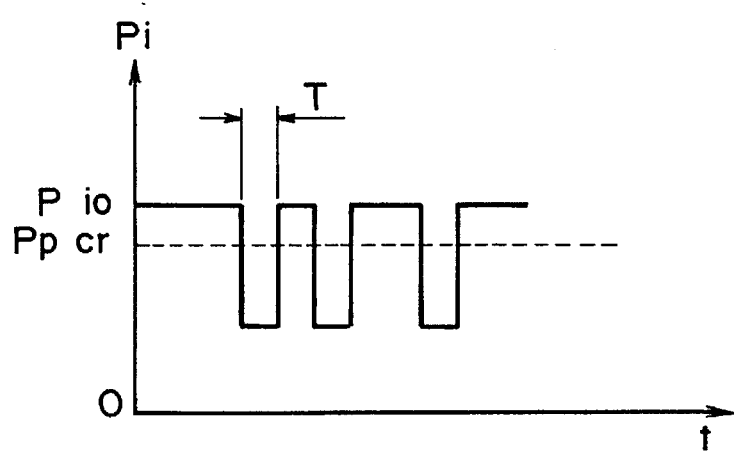
FIG. 21A and FIG. 21B are diagrams explanatory of the operating principle of the system of FIG. 20.
Figure 21B:
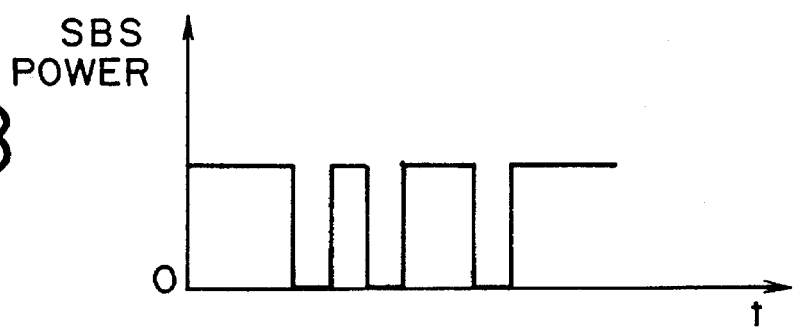

FIG. 20 shows a first embodiment of a multistage repeating system having a plurality of optical repeaters connected in series in the system of FIG. 19 with the principles of SBS applied thereto. In this example, there are connected, between the transmitting station 131 and the receiving station 135, N pieces of optical repeaters in series as indicated by reference numerals 141 (#1 to #N), each of which is arranged as shown in FIG. 19. The transmitting station 131 is connected with the first optical repeater 141 (#1) through an optical fiber 142 and the second and following optical repeaters 141 (#2 to #N) are connected through their respective optical fibers 143 with the optical repeaters in the following stages or the receiving station 135. In this case, the initial values or steady-state values $P_{i0}$ (i=1, 2, ..., N) of the input light power $P_i$ (i=1, 2, ..., N) are set to be greater than the $P_p^{cr}$ so that stimulated Brillouin scattering will take place. Output light of an arbitrary optical amplifier 141 (#i, i is an arbitrary number) is amplitude-modulated with the monitoring signal of the optical amplifier 141 so that the minimum points of the output amplitude become smaller than the value $P_p^{cr}$ as shown in FIG. 21A. By so doing, such a state can be brought about where stimulated Brillouin scattering does not take place when $P_i < P_p^{cr}$, and thereby SBS on/off modulation as shown in FIG. 21B can be achieved. By having such amplitude-modulated SBS light sequentially transmitted to the forward stages, the monitoring information of an arbitrary optical repeater can be transmitted to the transmitting station 131. In the present embodiment, since each optical fiber 141 constitutes a Brillouin amplifier, such losses as transmission loss and split loss in the beam splitter can be compensated for by its gain. In order that the monitoring signal transmitted from the optical repeater 141 (#1) to the transmitting station 131 is also amplified by stimulated Brillouin amplification, the optical fiber 142 connecting the optical repeater 141 (#1) and the transmitting station 131 is also formed of the nonlinear optical medium showing SBS like other optical fibers 143.

While it is desired that the modulated pulse width T is sufficiently greater than the attenuation constant of the phonon as shown in expression (23), the greater the T, the narrower the bandwidth of the information signal. It is apparent that the limit to the transmission speed in the present embodiment also depends on the effective reachable distance $L_{eff}$ of the exciting light and the limit becomes 1 kb/s as described above. Below will be described two embodiments suitable for use in transmission of high speed signals.

Figure 22:
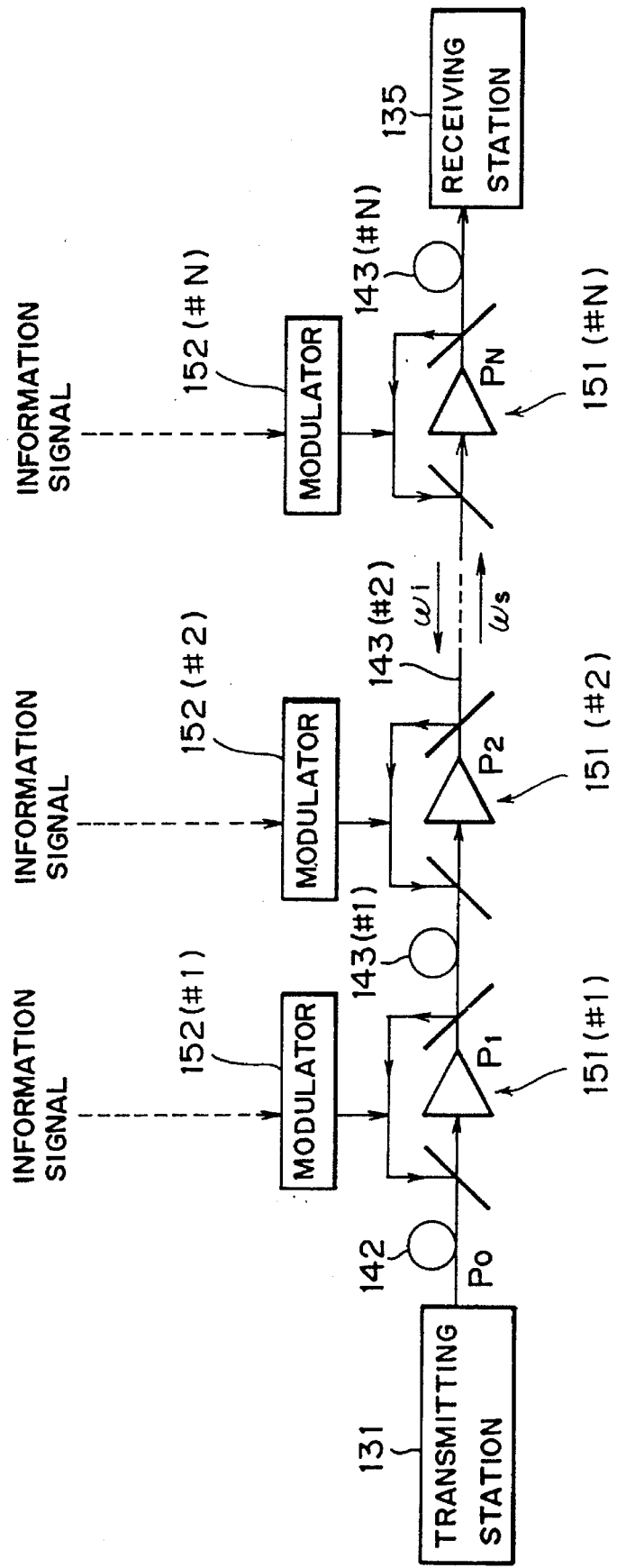
FIG. 22 is a diagram showing a second embodiment of a multistage repeating system.

FIG. 22 is a diagram showing a second embodiment of a multistage repeating system. There are connected, between the transmitting station 131 and the receiving station 135, a plurality of optical repeaters 151 (#1 to #N) in series and the optical output of each repeater is set to a value higher than the SBS threshold value. In each of the optical repeaters, SBS light passing through the detour optical path is subjected to external optical modulation in each modulator 152 (#1 to #N). In this case, the optical modulation may be provided either by direct modulation of the light source at an oscillation frequency of the Brillouin frequency $v_B$ or external modulation of the output light therefrom.

Figure 23:
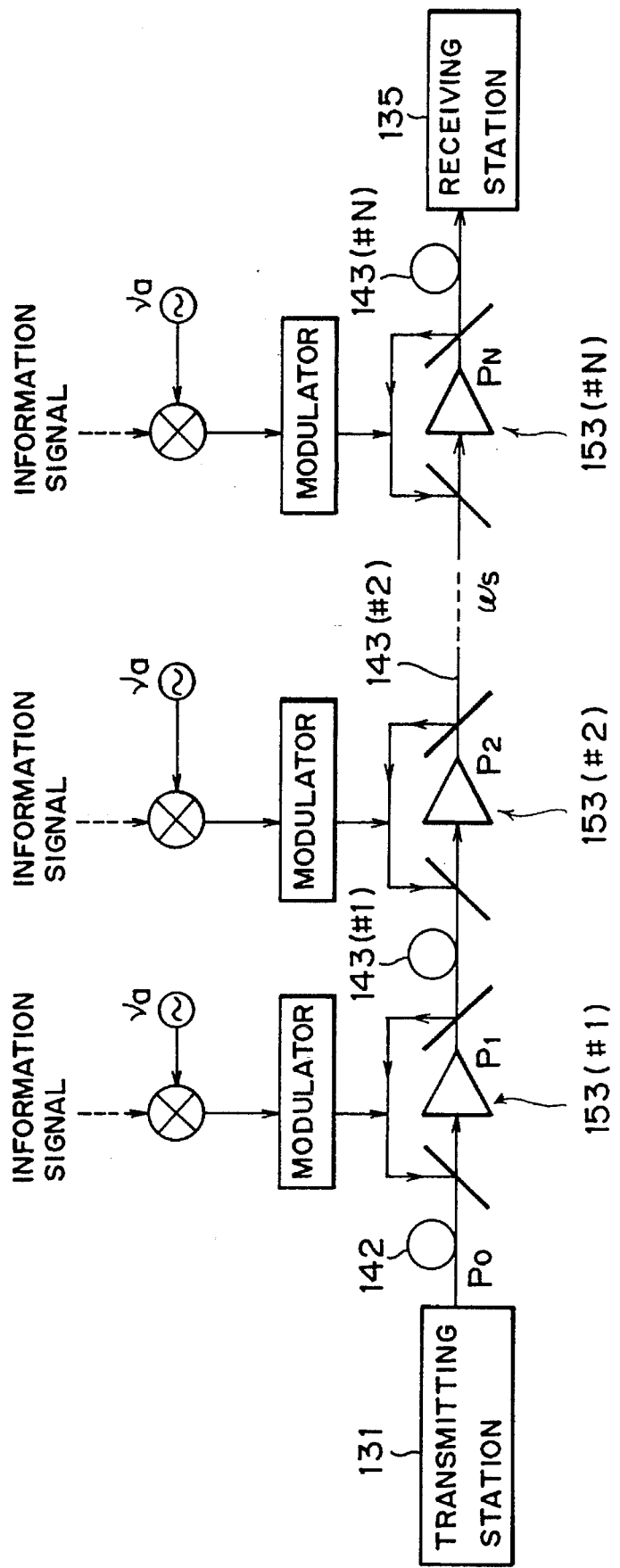
FIG. 23 is a diagram showing a third embodiment of a multistage repeating system.

FIG. 23 is a diagram showing a third embodiment of a multistage repeating system. In this embodiment, optical amplifiers 153 (#1 to #N) each thereof operating on the principle described in FIG. 14 and FIG. 15 are used. In this case, a portion of the output of each optical amplifier is arranged to branch off to be subjected to subcarrier modulation with a subcarrier having a frequency of $v_a$.

A distinguished feature of the embodiments shown in FIG. 22 and FIG. 23 is that the limit of the transmittable speed is greater than that in the system of FIG. 20. The factor restricting the transmission speed in these embodiments is the SBS relaxation time itself, i.e., the SBS band, and hence, transmission of the information signal at 10 to 100 Mb/s is achievable.

Figure 24:
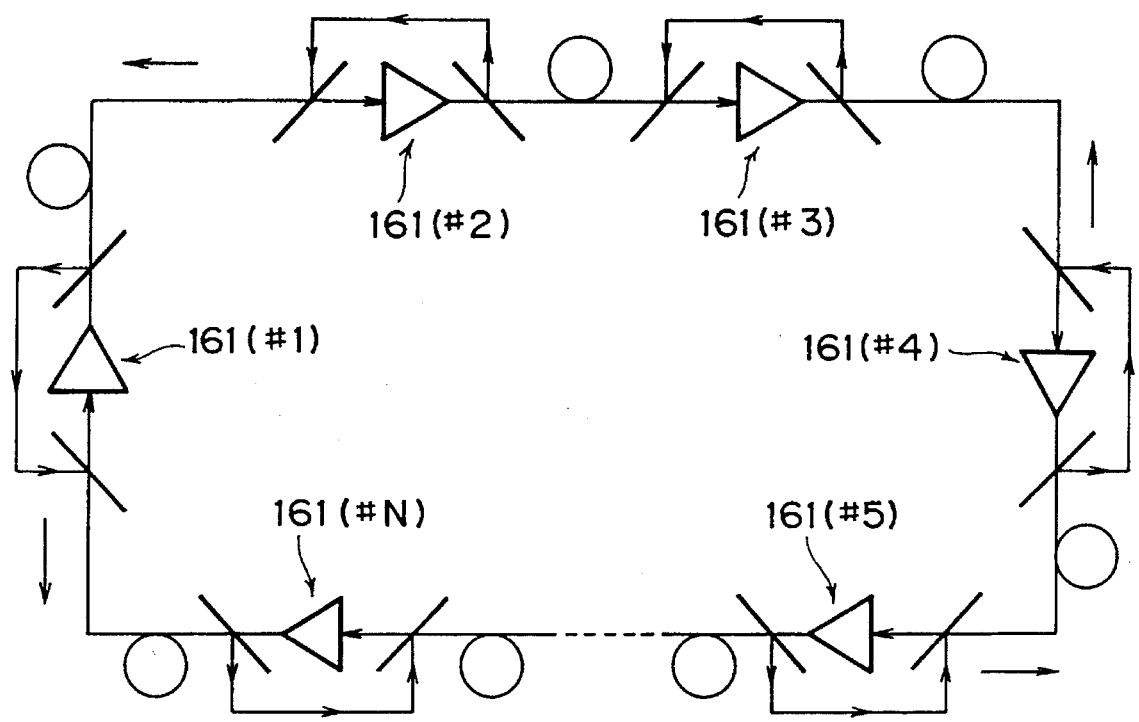
FIG. 24 is a diagram showing a first embodiment of a ring type two-way transmission system.

It is apparent that two-way transmission becomes possible by arranging a plurality of optical repeaters shown in FIG. 19 in a ring form. FIG. 24 shows a first embodiment of a two-way transmission system. This system is structured by using a plurality (#1 to #N) of optical repeaters 161 as shown in FIG. 19 and connecting them in a ring form. The forward direction in each of the optical repeaters 161 is arranged to be in a clockwise direction in the diagram. The main signal is transmitted clockwise in FIG. 24. On the other hand, the sub-signal constituted of amplitude-modulated SBS light is transmitted counterclockwise. For example, when a system having each optical amplifier housed in a terminal and the main signal distributed therefrom to each of the subscribers is considered, it is apparent that the sub-signal can be used for the transmission of such a signal as a request signal from each subscriber.

Figure 25:
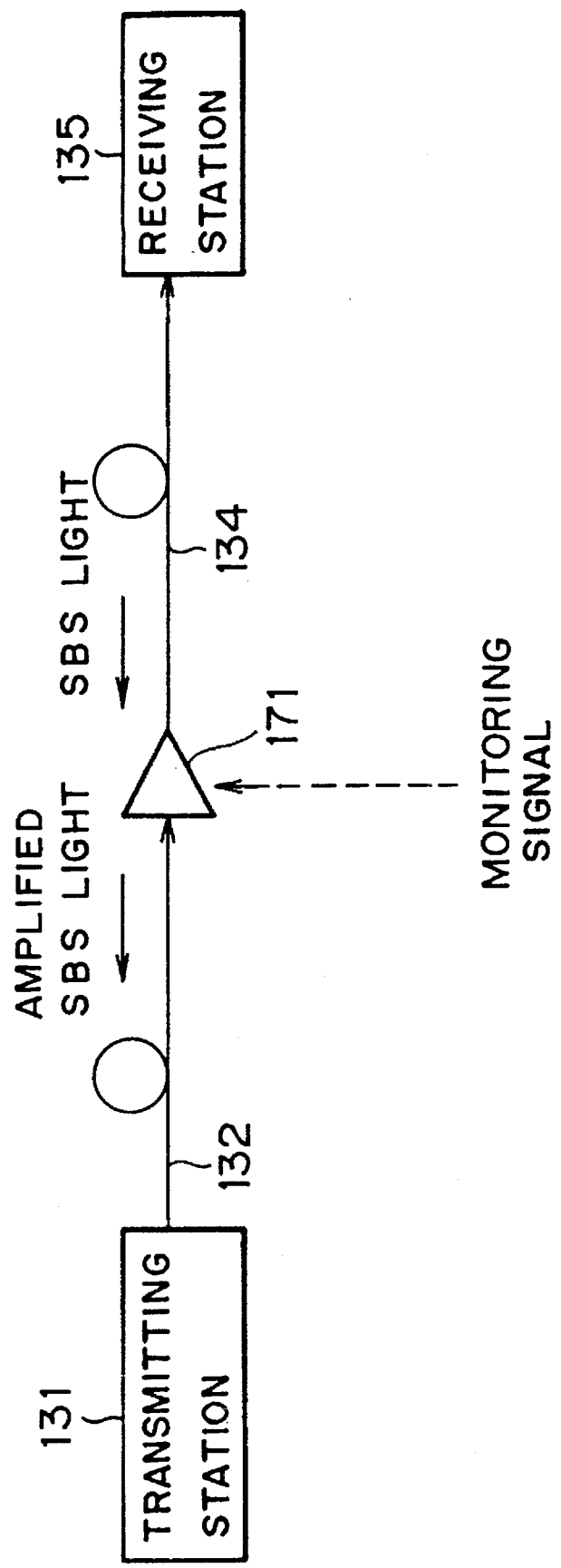
FIG. 25 is a diagram showing an optical communication system using a linear optical amplifier.

FIG. 25 is a diagram showing an optical communication system using a linear optical amplifier. In the optical communication system shown in FIG. 19, SBS light bearing monitoring information was transmitted to the transmitting station passing a detour branching from the main optical transmission line. In the present embodiment, however, SBS light bearing monitoring information is directly transmitted to the transmitting station, without passing a detour branching from the main optical transmission line, by making use of the bidirectional characteristic of the optical amplifier. Referring to FIG. 25, exciting light delivered from the transmitting station 131 is input forwardly to the optical amplifier 171 through the optical fiber 132. The optical amplifier 171 amplitude-modulates the supplied exciting light on the same operating principle as that described in FIG. 4 and FIG. 5 and delivers the modulated light to the optical fiber 134. The main signal component of the transmitted exciting light is transmitted to the receiving station 135. Meanwhile, SBS light generated in the optical fiber 134 between the optical amplifier 171 and the receiving station 135 is already amplitude-modulated with the above described monitoring signal. This light, when passing through the optical amplifier 171 in the reverse direction, is amplified by the optical amplifier 171 and the thus amplified light is transmitted to the transmitting station 131 through the optical fiber 132. As an optical amplifier capable of such linear amplifying operation, there are fiber type optical amplifiers provided with a doped fiber, and semiconductor optical amplifiers, etc.

Figure 26:
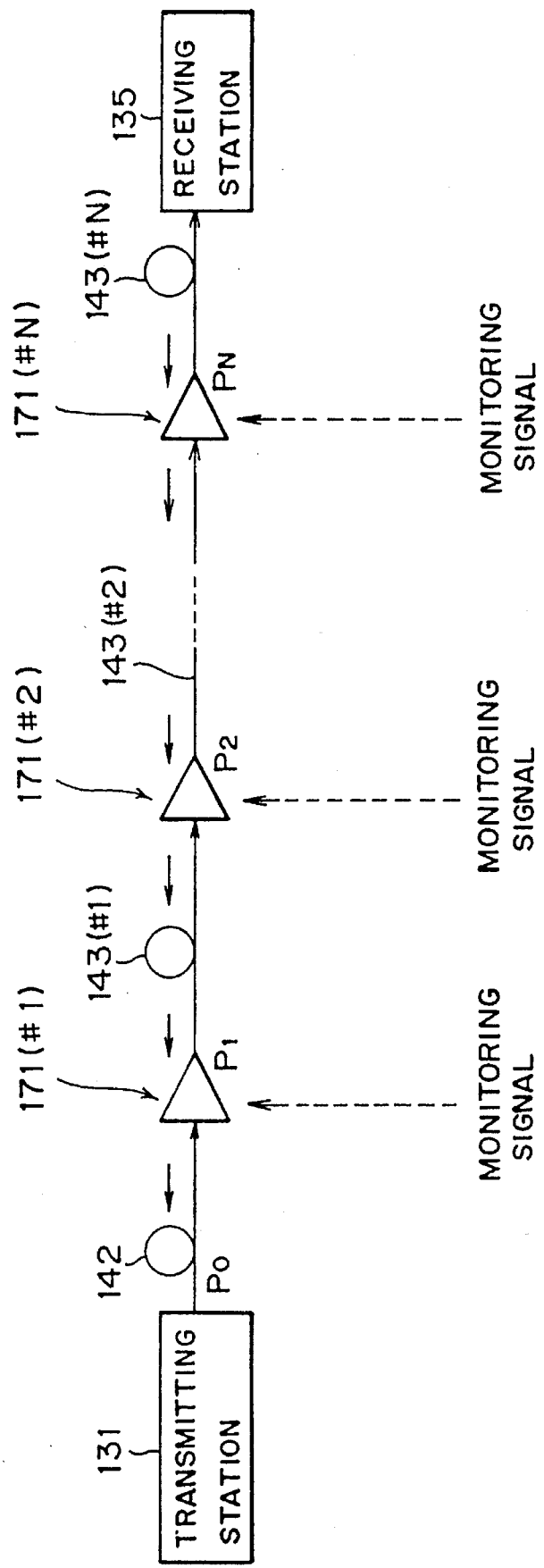
FIG. 26 is a diagram showing a fourth embodiment of a multistage repeating system.

FIG. 26 is a diagram showing a fourth embodiment of a multistage repeating system. In this embodiment, a plurality of linear optical amplifiers 171 (#1 to #N), each of which is as shown in FIG. 25, are connected in series to structure a multistage repeating system. Operation of each optical amplifier is in accordance with the system shown in FIG. 25 and the operation of the system as a whole is in accordance with the system shown in FIG. 20.

Figure 27:
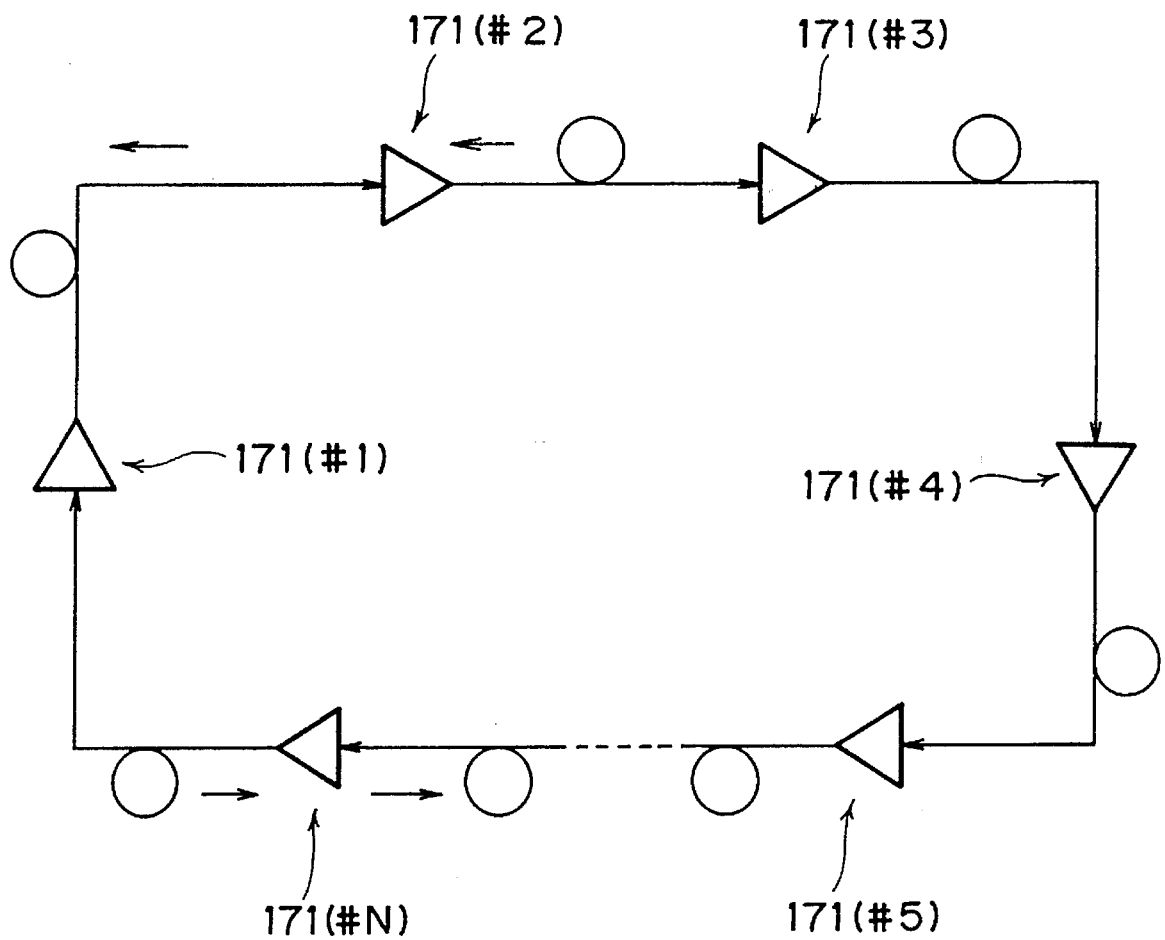
FIG. 27 is a diagram showing a second embodiment of a ring type two-way transmission system.

FIG. 27 is a diagram showing a second embodiment of a two-way transmission system. In this embodiment, a plurality of linear optical amplifiers 171 (#1 to #N), each of which is as shown in FIG. 25, are connected in a ring form such that the forward direction of each of the optical amplifiers is arranged in the same direction. Also with this arrangement, two-way transmission can be achieved on the operating principles in accordance with that of the system shown in FIG. 25 and the system shown in FIG. 24.

Figure 28:
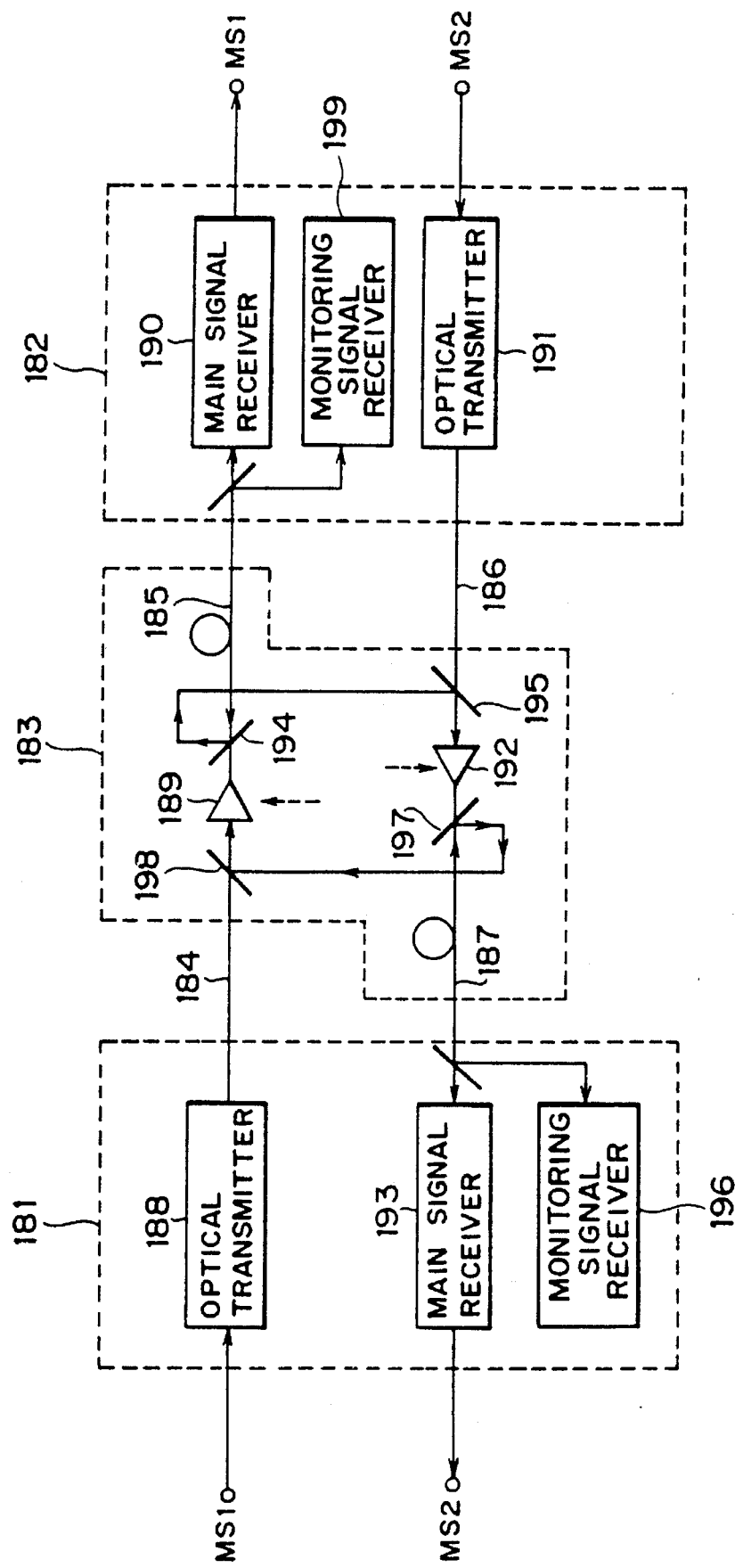
FIG. 28 is a diagram showing an embodiment of application of the present invention to up/down two lines.

FIG. 28 is a diagram of an embodiment in which the present invention is applied to an up/down two-line system. In this system, terminal stations 181 and 182 are connected through an optical repeating means 183. The up line going from the terminal station 181 to the terminal station 182 has optical transmission lines 184 and 185. The down line from the terminal station 182 to the terminal station 181 has optical transmission lines 186 and 187. Of the optical transmission lines 184, 185, 186, and 187, at least the optical transmission lines 185 and 187 are formed of a nonlinear optical medium showing SBS. An optical transmitter 188 in the terminal station 181 outputs exciting light which is modulated with a main signal MS1. The exciting light is supplied to the optical amplifier 189 through the optical transmission line 184. The exciting light amplified by the optical amplifier 189 is supplied to a main signal receiver 190 in the terminal station 182 through the optical transmission line 185. The main signal receiver 190 regenerates the main signal MS1. An optical transmitter 191 in the terminal station 182 outputs exciting light modulated with a main signal MS2. This exciting light is supplied to an optical amplifier 192 through the optical transmission line 186. The exciting light amplified by the optical amplifier 192 is supplied to a main signal receiver 193 in the terminal station 181 through the optical transmission line 187. The main signal receiver 193 regenerates the main signal MS2. The gain of the optical amplifier 189 is modulated with a monitoring signal of the up line. Further, the gain is controlled so that the SBS threshold value in the optical transmission line 185 is positioned between the high level and the low level of the modulated waveform of the exciting light supplied from the optical amplifier 189 to the optical transmission line 185. The gain of the optical amplifier 192 is modulated with a monitoring signal of the down line. Further, the gain is controlled so that the SBS threshold value in the optical transmission line 187 is positioned between high level and low level of the modulated waveform of the exciting light supplied from the optical amplifier 192 to the optical transmission line 187.

When the modulated exciting light is supplied to the optical transmission line 185, SBS light corresponding to the monitoring signal is generated in the opposite direction to the exciting light. The SBS light is extracted from the up line by a beam splitter 194 and supplied to the optical amplifier 192 in the down line through an optical coupler 195. Thereby, the monitoring signal of the up line can be received by a monitoring signal receiver 196 in the terminal station 181. On the other hand, SBS light generated in the optical transmission line 187 of the down line is extracted therefrom by a beam splitter 197 and supplied to the optical amplifier 189 in the up line through an optical coupler 198. Thereby, the monitoring signal of the down line can be received by a monitoring signal receiver 199 in the terminal station 182.

Figure 29:
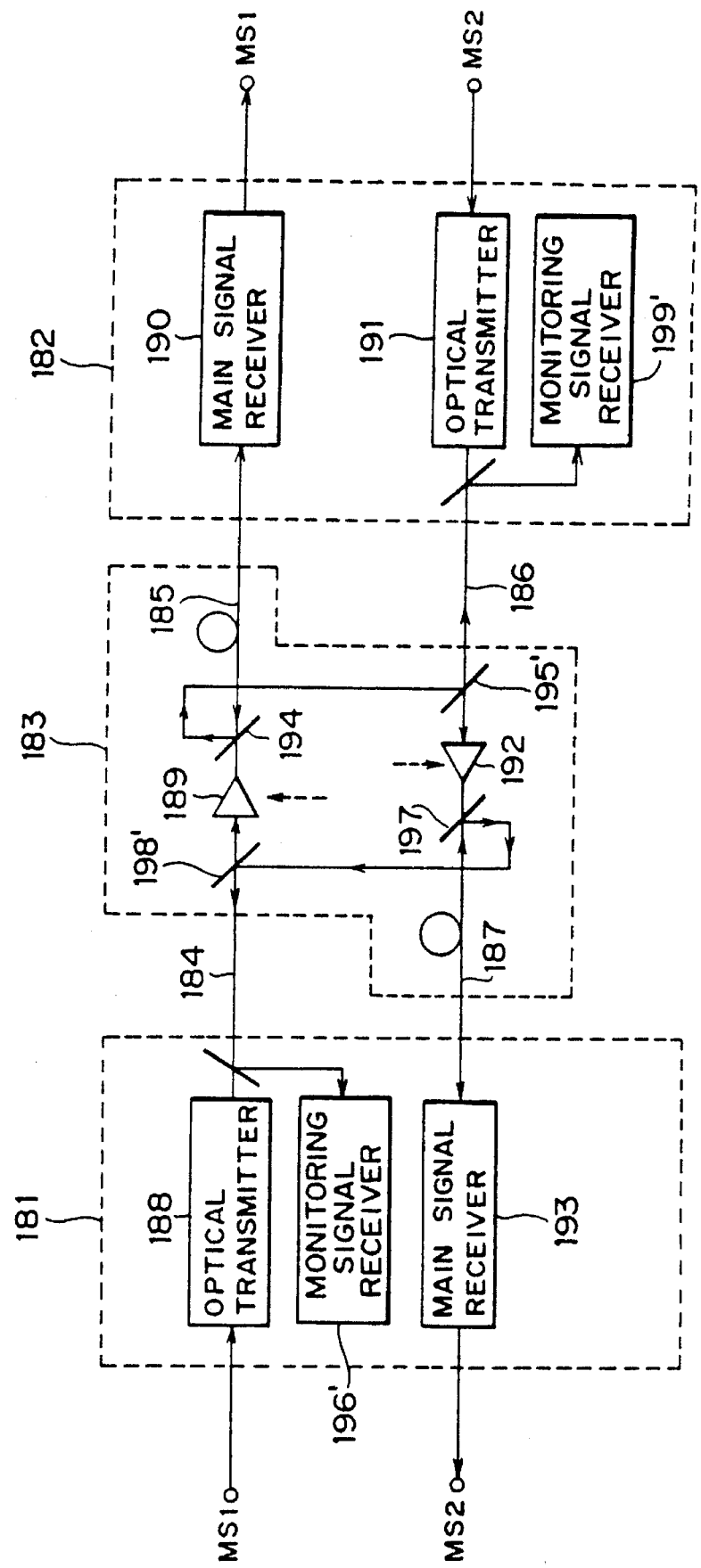
FIG. 29 is a diagram showing another embodiment of application of the present invention to up/down two lines.

FIG. 29 is a diagram of another embodiment in which the present invention is applied to an up/down two-line system. In comparison to the system of FIG. 28, this embodiment is characterized in that the monitoring signal of the up line is received by the terminal station 182 and the monitoring signal of the down line is received by the terminal station 181. SBS light generated in the optical transmission line 185 corresponding to the monitoring signal of the up line is extracted therefrom by the beam splitter 194 and coupled to the down line for the terminal station 182 by an optical couple 195'. The SBS light is supplied to a monitoring signal receiver 199' in the terminal station 182, where the monitoring signal of the up line is regenerated. On the other hand, SBS light generated in the optical transmission line 187 corresponding to the monitoring signal of the down line is extracted therefrom by the beam splitter 197 and coupled to the up line for the terminal station 181 by an optical couple 198'. The SBS light is supplied to a monitoring signal receiver 196' in the terminal station 181, where the monitoring signal of the down line is regenerated.

Figure 30:
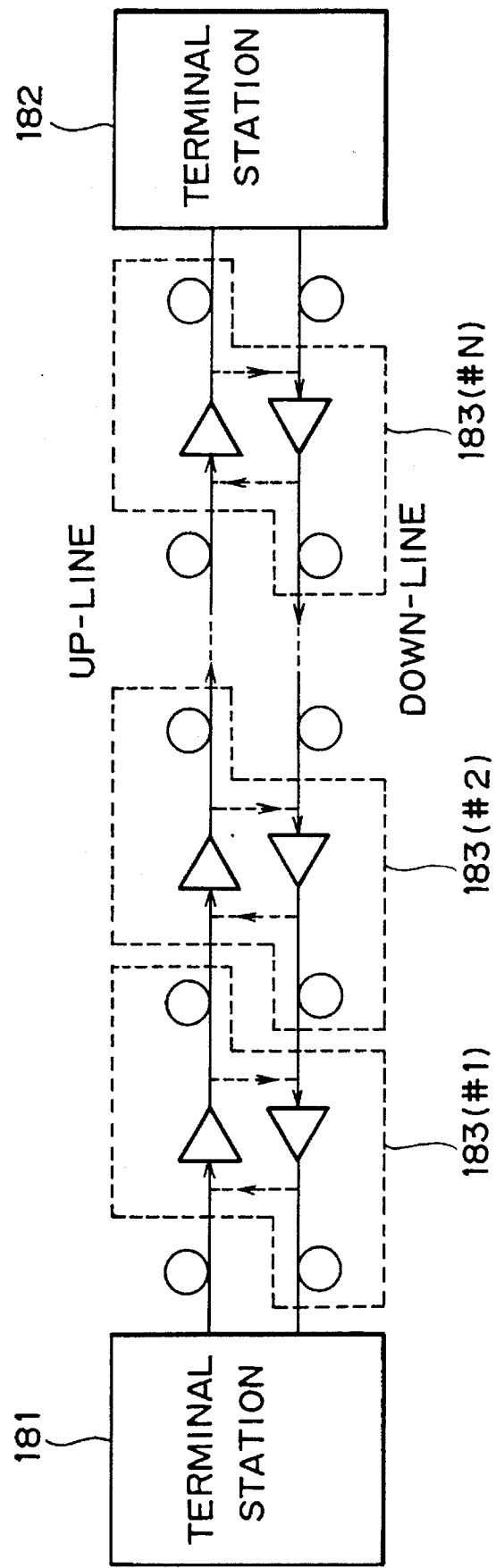
FIG. 30 is a diagram showing an embodiment of a multistage connection of optical amplifiers in FIG. 28 or FIG. 29.

FIG. 30 is a diagram showing a multistage repeating system applied to an up/down two-line system. Terminal stations 181 and 182 are connected through N (a natural number larger than 1) optical repeaters 183 (#1 to #N). Each optical repeater 183 (#1 to #N) is constructed similarly to the optical repeating means in FIG. 28 or FIG. 29. When monitoring of such two up/down lines having a plurality of optical repeaters is practiced, it is preferred, to make it easy to decide from which optical repeater a received monitoring signal has been issued, that the identification number of each optical repeater is coded and, thereby, the terminal station, upon regeneration of a monitoring signal, can identify the optical repeater which has issued the monitoring signal.

Figure 31:
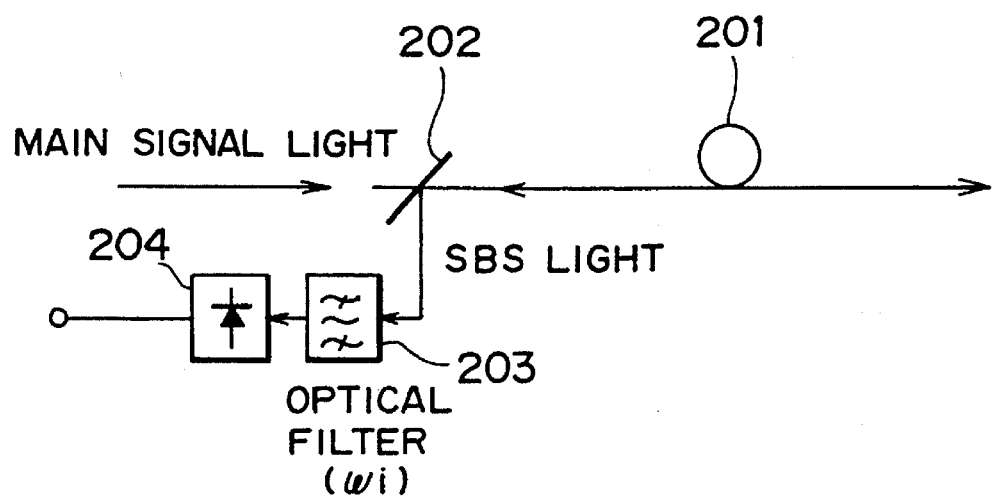
FIG. 31 is a diagram showing a first embodiment of a monitoring signal receiver.

FIG. 31 is a diagram showing a first embodiment of a monitoring signal receiver. This receiver is usable as the monitoring signal receiver 196' or 199' in FIG. 29 and also applicable to the optical transmitting station 131 (refer to FIGS. 19, 20, 22, 23, 25, and 26). Main signal light from an optical transmitter, for example the exciting light from the optical transmitter 188 in FIG. 29, is transmitted on an optical transmission line 201 through a beam splitter 202. SBS light (bearing monitoring information) propagating through the optical transmission line 201 from the right to the left of the diagram is split by the beam splitter 202 so that a portion is supplied to an optical bandpass filter 203. The band of the SBS light is included in the passband of the bandpass filter 203. The SBS light passed through the optical bandpass filter 203 is directly detected by a photodiode 204 and, thereby, the monitoring signal from an optical repeater is regenerated.

Figure 32:
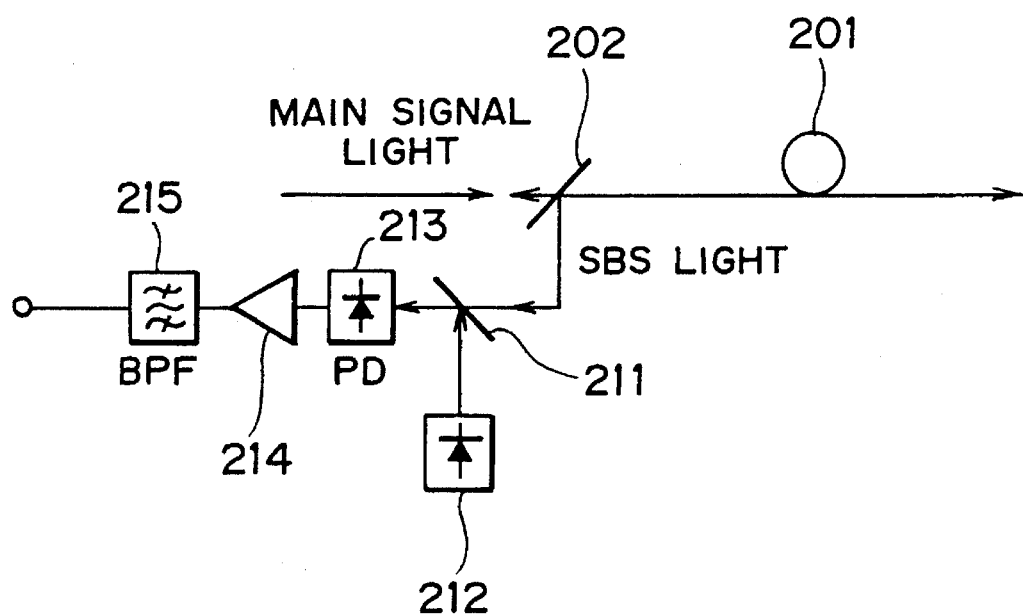
FIG. 32 is a diagram showing a second embodiment of a monitoring signal receiver.

FIG. 32 is a diagram showing a second embodiment of a monitoring signal receiver. This receiver can be used in place of the receiver in FIG. 31. In this embodiment, SBS light branching off the beam splitter 202 is subjected to heterodyne detection. More specifically, the SBS light is added to local light from a local laser diode 212 by an optical coupler 211 and the light added together is supplied to a photodiode 213. As a result of optical/electrical conversion in the photodiode 213, heterodyne detected signal (intermediate frequency signal) corresponding to the difference between the frequency of the SBS light and the frequency of the local light is obtained. This signal is amplified by an amplifier 214 and supplied to a bandpass filter 215. The bandpass filter 215 allows the frequency component corresponding the frequency of the intermediate frequency signal to pass therethrough. Also by the present arrangement, the monitoring signal from the optical repeater can be regenerated. In this case, by adjusting the frequency of the local light, SBS light of a desired frequency can be selectively tuned. Further, highly sensitive reception can be achieved by using the local laser diode 212 with high power.

Figure 33:
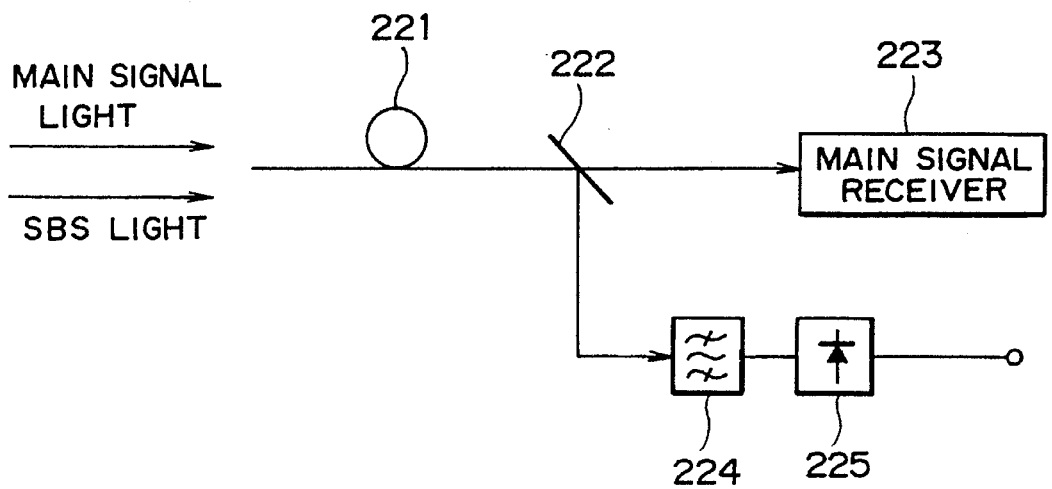
FIG. 33 is a diagram showing a third embodiment of a monitoring signal receiver.

FIG. 33 is a diagram showing a third embodiment of a monitoring signal receiver. This receiver can be used as the monitoring signal receiver 196 or 199 in FIG. 28 and can also be applied to the optical receiving station 135 (refer to FIGS. 19, 20, 22, 23, 25, and 26). Main signal light and SBS light propagated through an optical transmission line 221 from the left to the right of the diagram is split by a beam splitter 222. One of the split beams is supplied to a main signal receiver 223 and, therein, the main signal is regenerated. The other of the split beams is supplied to an optical bandpass filter 224. The bandpass filter 224 allows the SBS light to pass therethrough. This SBS light is directly detected by a photodiode 225 and, thereby, the monitoring signal from an optical repeater is regenerated.

Figure 34:
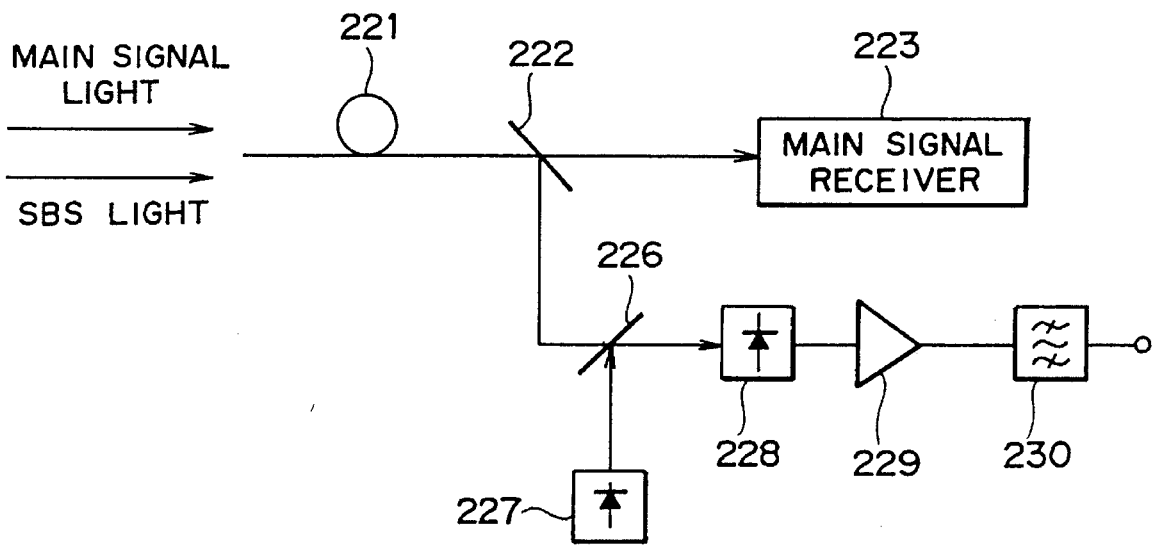
FIG. 34 is a diagram showing a fourth embodiment of a monitoring signal receiver.

FIG. 34 is a diagram showing a fourth embodiment of a monitoring signal receiver. This receiver can be used in place of the receiver in the third embodiment of FIG. 33. In this embodiment, heterodyne detection is performed the same as in the second embodiment of FIG. 32. Separated light by a half mirror 222 is added to local light from a local laser diode 227 in an optical coupler 226 and these light beams are supplied to a photodiode 228. An intermediate frequency signal produced in the photodiode 228 is amplified by an amplifier 229 and then passed through a bandpass filter 230 and, thereby, the monitoring signal from an optical repeater is regenerated.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An optical signal generator making use of the phenomenon of stimulated Brillouin scattering comprising:

optical modulating means for modulating exciting light with a first information signal to thereby output amplitude-modulated light;

an optical transmission line formed of a nonlinear optical medium showing stimulated Brillouin scattering and operatively connected with said optical modulating means for propagating said amplitude modulated light therethrough; and control means operatively connected with said optical modulating means for controlling said optical modulating means so that the threshold value for stimulated Brillouin scattering in said optical medium is positioned between a high level and a low level of the modulated waveform of said amplitude-modulated light with said first information signal; wherein modulated stimulated Brillouin scattered light is generated in said optical transmission line in the direction opposite to the propagating direction of said amplitude-modulated light.

2. An optical signal generator according to claim 1, wherein said exciting light has previously been modulated with a second information signal having a higher frequency or a higher bit rate than said first information signal.

3. An optical signal generator according to claim 1, wherein said optical transmission line is formed of a silica single mode fiber.

4. An optical signal generator according to claim 1, wherein said optical modulating means includes a light source for outputting said exciting light and an optical modulator operatively connected with said light source for amplitude-modulating said exciting light, and said optical modulator is driven with said first information signal.

5. An optical signal generator according to claim 1, wherein said optical modulating means includes a laser diode for outputting said exciting light, the bias current for said laser diode being modulated with said first information signal.

6. An optical signal generator according to claim 1, wherein said optical modulating means includes an optical amplifier for amplifying said exciting light, the gain of said optical amplifier being modulated with said first information signal.

7. An optical signal generator according to claim 6, wherein said optical amplifier has a semiconductor gaining medium, the injected current to said gaining medium being modulated with said first information signal.

8. An optical signal generator according to claim 6, wherein said optical amplifier includes a pump laser diode for outputting pumping light, an optical coupler for adding said pumping light to said exciting light and outputting the light added together, and a doped fiber doped with a rare earth element to which said pumping light and said exciting light are supplied, and the bias current for said pump laser diode is modulated with said first information signal.

9. An optical signal generator according to claim 6, wherein said optical amplifier includes a first pump laser diode for outputting first pumping light, a first optical coupler for adding said first pumping light to said exciting light and outputting the light added together, a doped fiber doped with a rare earth element and supplied with said first pumping light and said exciting light output from said first optical coupler from its one end, a second pump laser diode for outputting second pumping light, and a second optical coupler for supplying said second pumping light to said doped fiber from its second end, and at least either of the bias currents for said first and second pump laser diodes is modulated with said first information signal.

10. An optical signal generator for transmitting optical information through an optical medium having a stimulated Brillouin scattering threshold comprising:

optical modulating means for modulating exciting light with a first information signal to produce amplitude-modulated light, and for outputting the amplitude-modulated light in a propagating direction with a high level above said stimulated Brillouin scattering threshold and a low level below said Brillouin scattering threshold; wherein modulated stimulated Brillouin scattered light is generated in said optical medium in a direction opposite to the propagating direction of the amplitude-modulated light when the amplitude-modulated light exceeds the stimulated Brillouin scattering threshold.

* * * * *

UNITED STATES PATENT AND TRADEMARK OFFICE
CERTIFICATE OF CORRECTION

PATENT NO. : 5,515,192
DATED : May 7, 1996
INVENTOR(S) : Shigeki WATANABE

It is certified that error appears in the above-indentified patent and that said Letters Patent is hereby corrected as shown below:

Column 2, line 32, change "With" to --with--.
Column 4, line 2, insert --,-- after "accordingly";
          line 9, change "," to --;--;
          line 12, in the equation change "$\omega_s=\omega_{o-\omega a}$" to --$\omega_s=\omega_o-\omega_a$--;
          line 16, insert --,-- after "$\omega_a$"
          line 67, change "$T_b$" to --$T_B$--.
Column 5, delete equation (12) and insert --$I_p(z) = [(1-b_0)G(z)/(G(z)-b_0)]I_p(0)\exp(-\alpha z)$--;

delete equation (15) and insert --$go=g_B I_p(0)$--.

Column 9, line 53, insert --,-- after "other"; and
          line 67, insert --,-- after "value".

Signed and Sealed this

Twenty-third Day of July, 1996

BRUCE LEHMAN

*Attest:*

*Attesting Officer*     *Commissioner of Patents and Trademarks*